United States Patent
Joshi et al.

(10) Patent No.: US 9,998,977 B2
(45) Date of Patent: Jun. 12, 2018

(54) INTER-SUBNET AND INTRA-SUBNET ROAMING

(71) Applicant: QUALCOMM Incorporated, San Diego, CA (US)

(72) Inventors: Ravi Arun Joshi, Sunnyvale, CA (US); Hoon Ki Lee, San Jose, CA (US); Shravya Kunamalla, San Jose, CA (US); Dagbegnon Henri Bahini, San Diego, CA (US); Rajesh Chauhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 252 days.

(21) Appl. No.: 14/939,935

(22) Filed: Nov. 12, 2015

(65) Prior Publication Data

US 2017/0142636 A1 May 18, 2017

(51) Int. Cl.
*H04W 40/24* (2009.01)
*H04W 40/00* (2009.01)
*H04W 40/36* (2009.01)
*H04W 36/00* (2009.01)
*H04W 84/12* (2009.01)
*H04W 8/26* (2009.01)
*H04W 36/08* (2009.01)

(52) U.S. Cl.
CPC ...... *H04W 40/246* (2013.01); *H04W 36/0011* (2013.01); *H04W 40/005* (2013.01); *H04W 40/36* (2013.01); *H04W 8/26* (2013.01); *H04W 36/08* (2013.01); *H04W 84/12* (2013.01)

(58) Field of Classification Search
CPC ....... H04W 4/02; H04W 36/08; H04W 48/18; H04W 84/12; H04W 48/16; H04W 88/06; H04W 48/20; H04W 84/042; H04L 45/04
See application file for complete search history.

(56) References Cited

U.S. PATENT DOCUMENTS

| | | | | |
|---|---|---|---|---|
| 7,082,114 | B1 * | 7/2006 | Engwer | H04W 36/0011 370/331 |
| 9,179,407 | B2 * | 11/2015 | Donthi | H04W 52/0216 |
| 9,462,543 | B2 * | 10/2016 | Ramkumar | H04W 48/20 |
| 9,615,272 | B2 * | 4/2017 | Morad | H04W 24/06 |
| 9,686,736 | B2 * | 6/2017 | Baratam | H04W 48/16 |
| 2002/0197992 | A1 * | 12/2002 | Nizri | H04W 60/04 455/435.1 |

(Continued)

OTHER PUBLICATIONS

ISA/EP, International Search Report and Written Opinion of the International Searching Authority, Int'l Application No. PCT/US2016/061158, dated Feb. 17, 2017, European Patent Office, Rijswijk, NL, 17 pgs.

*Primary Examiner* — Wutchung Chu
(74) *Attorney, Agent, or Firm* — Holland & Hart LLP

(57) ABSTRACT

Methods, systems, and devices are described for wireless communication. A station (STA) with a host processor and a radio processor may communicate with a first access point (AP) in a first subnet. The STA may store network information for the first subnet in memory of the STA. The STA may identify a second access point and determine, by the radio processor without communication with the host processor, whether the second access point is in the first subnet or a second subnet. The determination may be based at least in part on the network information stored in memory.

20 Claims, 13 Drawing Sheets

(56) References Cited

U.S. PATENT DOCUMENTS

| | | | |
|---|---|---|---|
| 2005/0074015 A1* | 4/2005 | Chari | H04L 12/2856 370/400 |
| 2008/0019319 A1 | 1/2008 | Bahini et al. | |
| 2008/0056272 A1* | 3/2008 | Batta | H04W 12/06 370/395.5 |
| 2008/0108346 A1* | 5/2008 | Umatt | H04W 48/16 455/432.1 |
| 2008/0301322 A1* | 12/2008 | Horibe | H04L 12/12 709/245 |
| 2009/0034469 A1* | 2/2009 | Kim | H04W 36/14 370/331 |
| 2009/0111524 A1 | 4/2009 | Basaralu | |
| 2010/0293250 A1* | 11/2010 | Ankaiah | H04L 12/56 709/219 |
| 2011/0274082 A1* | 11/2011 | Calhoun | H04W 40/24 370/331 |
| 2012/0015653 A1* | 1/2012 | Paliwal | H04W 24/10 455/435.1 |
| 2012/0120789 A1* | 5/2012 | Ramachandran | H04W 36/0022 370/220 |
| 2013/0157661 A1* | 6/2013 | Bhaskaran | H04W 60/00 455/436 |
| 2013/0188499 A1* | 7/2013 | Mach | H04W 48/20 370/252 |
| 2014/0220975 A1* | 8/2014 | Makharia | H04W 76/048 455/436 |
| 2014/0228026 A1* | 8/2014 | Venkatachari | H04B 7/0871 455/436 |
| 2014/0321416 A1* | 10/2014 | Pragada | H04W 88/04 370/329 |
| 2014/0334438 A1* | 11/2014 | Cohen-Arazi | H04W 36/0077 370/331 |
| 2015/0271720 A1* | 9/2015 | Yamada | H04W 76/023 370/331 |
| 2016/0099936 A1* | 4/2016 | Enke | H04L 63/0428 726/7 |
| 2016/0119858 A1* | 4/2016 | Liu | H04W 48/16 455/434 |
| 2016/0183156 A1* | 6/2016 | Chin | H04W 36/0022 370/331 |
| 2016/0192435 A1* | 6/2016 | Gupta | H04W 15/00 370/311 |
| 2016/0255580 A1* | 9/2016 | Onaka | H04W 48/00 370/311 |
| 2016/0323799 A1* | 11/2016 | Morgan | H04W 36/30 |
| 2016/0345149 A1* | 11/2016 | Chuttani | H04W 4/22 |

* cited by examiner

INTER-SUBNET AND INTRA-SUBNET ROAMING

BACKGROUND

The present disclosure relates generally to wireless communication, and more specifically to inter-subnet and intra-subnet roaming.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi network (IEEE 802.11), may include an access point (AP) that may communicate with one or more stations (STAs) or mobile devices.

A WLAN may be made up of a number of subnets, each of which is associated with different network information (e.g., a different STA IP address, gateway IP address, gateway media access control (MAC) address, or gateway Internet Protocol (IP) address type). A STA may use the network information for a subnet to communicate with a gateway for the subnet. An AP in a subnet may be in communication with a network, such as the Internet, which may allow a STA or mobile device to communicate via the network (or communicate with other devices communicating with the AP). A STA or mobile device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

In some cases, a STA may perform roaming in which the STA changes connection from one AP (a pre-roaming AP) to a new AP. Upon connection with the new AP, the STA may wirelessly retrieve the network information for the subnet of the new AP. In some cases, the new AP is in the same subnet as the pre-roaming AP (i.e., the STA has not changed subnets) and the pre-roaming network information is the same. In other cases, the new AP is in a different subnet than the pre-roaming AP and has different network information than the pre-roaming AP. In such cases, the STA may wirelessly retrieve the network information for the new subnet of the new AP.

SUMMARY

A station (STA) that includes a host processor and a radio processor may communicate with a first access point (AP) in a first subnet of a wireless local area network (WLAN). Prior to roaming, the host processor may store network information for the first subnet in memory and enter a sleep state. While the host processor is in the sleep state, the STA may roam from the first AP to a second AP. The second AP may be in the same subnet as the first AP or a different, second subnet of the WLAN. After the roaming, the radio processor of the STA may determine whether the second AP is in a second subnet based on the stored network information. The determination may occur while the host processor is in the sleep state.

In some cases, the radio processor may detect that the second AP is in the second subnet (e.g., inter-subnet roaming has occurred). Based on the inter-subnet roaming detection, the radio processor may awaken the host processor from a sleep state. The host processor may determine network information for the second subnet and store it in memory before re-entering the sleep state. Thus, the host processor may use the stored network information when processing packets to or from the second subnet. In some cases, the radio processor may detect that the second AP is in the first subnet (e.g., intra-subnet roaming has occurred). In such a scenario, the radio processor may allow the host processor to remain in the sleep state because the stored network information is still valid (e.g., the stored network information does not need updating). In some examples, determining whether the second AP is in the second subnet includes sending an address information request using the stored network information. If the address information request fails, the radio processor may determine that inter-subnet roaming has occurred. If the address information request succeeds, the radio processor may determine that intra-subnet roaming has occurred.

An apparatus for wireless communication is described. The apparatus may include a radio processor, a host processor, memory in electronic communication with the radio processor or the host processor, and instructions stored in the memory that are operable, when executed by the radio processor or the host processor, to cause the apparatus to communicate with a first access point that is included within a first subnet, store network information for the first subnet in the memory, and identify a second access point. The instructions stored in memory may also be operable, when executed by the radio processor, to cause the apparatus to determine, without communication between the radio processor and the host processor, whether the second access point is in the first subnet or a second subnet based at least in part on the stored network information.

In some examples of the apparatus, the determination may be may by the radio processor while the host processor is in the sleep state. In other examples, the instructions are operable, when executed by the radio processor, to cause the apparatus to detect that the second access point is in the second subnet and awaken the host processor from the sleep state based at least in part on the detection that the second access point is in the second subnet. In some examples of the apparatus, the instructions are operable, when executed by the host processor, to cause the apparatus to determine network information for the second subnet and store the network information for the second subnet in the memory. In some cases, the instructions that cause the apparatus to store the network information in the memory are instructions that cause the host processor to cache the network information in firmware.

In some examples of the apparatus, the instructions that cause the apparatus to identify the second access point are further operable, when executed by the radio processor, to cause the apparatus to initiate roaming to the second access point. In some cases, the instructions are further operable, when executed by the host processor or the radio processor, to cause the apparatus to receive an incoming packet at the apparatus from the second access point. The instructions may be operable, when executed by the host processor, to cause the apparatus to store the network information for the second subnet in the memory and process the incoming packet based at least in part on the stored network information for the second subnet. In some cases, the host processor may be configured to awaken from a sleep state in response to receipt of the incoming packet.

In some examples of the apparatus, the instructions are operable, when executed by the radio processor, to cause the apparatus to initiate an address resolution process to determine whether the second access point is in the first subnet or the second subnet. In some cases, the instructions are further operable, when executed by the radio processor, to cause the apparatus to determine that the host processor has awakened from a sleep state during the address resolution process, and terminate the address resolution process based at least in part on the determination that the host processor has awakened from the sleep state. In some cases, the instructions are operable, when executed by the radio processor, to cause the apparatus to detect that the second access point is in the same subnet as the first access point and allow the host processor to remain in a sleep state based at least in part on the detection.

In some examples of the apparatus, the instructions that are operable to cause the apparatus to determine the whether the second access point is in the first subnet or the second subnet are further operable, when executed by the radio processor, to cause the apparatus to send an address information request using the stored network information, detect that the address information request has failed, and determine that the second access point is in the second subnet based at least in part on the failed address information request. In some cases, the address information request is at least an address resolution protocol (ARP) request, or a neighbor solicitation request, or a combination thereof. In some cases, the instructions that are operable to cause the apparatus to determine the whether the second access point is in the second subnet are further operable, when executed by the radio processor, to cause the apparatus to send an address information request using the stored network information, receive a response to the address information request, and determine that the second access point is in the first subnet based at least in part on the response to the address information request.

In some cases, the stored network information comprises gateway information associated with the first subnet, the gateway information comprising at least one of a gateway internet protocol (IP) address, or a gateway media access control (MAC) address, or a gateway address type, or a combination thereof. In some examples of the apparatus, the instructions are operable, when executed by the host processor, to cause the apparatus to perform a dynamic host configuration protocol (DHCP) process to determine the network information for the first subnet.

A method of wireless communication is described. The method may include communicating between a station and a first access point that is included within a first subnet, wherein the station includes a radio processor and a host processor, storing, by the station, network information for the first subnet in memory, identifying, by the station, a second access point, and determining, by the radio processor without communication between the radio processor and the host processor during the determination, whether the second access point is in the first subnet or a second subnet based at least in part on the stored network information.

In some examples, the determination may be by the radio processor while the host processor is in the sleep state. In some examples, the method includes detecting, by the radio processor, that the second access point is in the second subnet and awakening the host processor from the sleep state based at least in part on the detection that the second access point is in the second subnet. In some examples the method includes determining, by the host processor, network information for the second subnet and storing the network information for the second subnet in the memory. In some cases, storing the network information in memory includes caching the network information in firmware.

In some examples the method includes initiating, by the radio processor, roaming to the second access point. In some cases, the method includes receiving an incoming packet at the apparatus from the second access point. In some cases, the method includes storing, by the host processor, the network information for the second subnet in the memory and processing the incoming packet based at least in part on the stored network information for the second subnet. In some cases, the host processor may be configured to awaken from a sleep state in response to receipt of the incoming packet.

In some examples, the method includes initiating, by the radio processor, an address resolution process to determine whether the second access point is in the first subnet or the second subnet. In some cases, the method includes determining that the host processor has awakened from a sleep state during the address resolution process and terminating the address resolution process based at least in part on the determination that the host processor has awakened from the sleep state. In some cases, the method includes detecting, by the radio processor, that the second access point is in the same subnet as the first access point and allowing the host processor to remain in a sleep state based at least in part on the detection.

In some examples, determining whether the second access point is in the first subnet or the second subnet includes sending, by the radio processor, an address information request using the stored network information, detecting, by the radio processor, that the address information request has failed, and determining, by the radio processor, that the second access point is in the second subnet based at least in part on the failed address information request. In some cases, the address information request is at least an ARP request, or a neighbor solicitation request, or a combination thereof. In some cases, determining whether the second access point is in the first subnet or the second subnet includes sending, by the radio processor, an address information request using the stored network information, receiving, by the radio processor a response to the address information request, and determining, by the radio processor, that the second access point is in the first subnet based at least in part on the response to the address information request.

In some cases, the stored network information includes gateway information associated with the first subnet, the gateway information including at least one of a gateway IP address, or a gateway MAC address, or a gateway address type, or a combination thereof. Some examples of the method include performing, by the host processor, a DHCP process to determine the network information for the first subnet.

An apparatus for wireless communication is described. The apparatus may include means for communicating between the apparatus and a first access point that is included within a first subnet, wherein the apparatus includes a radio processor and a host processor, means for storing network information for the first subnet in memory, means for identifying a second access point, and means for determining, by the radio processor without communication between the radio processor and the host processor during the determination, whether the second access point is in the first subnet or a second subnet based at least in part on the stored network information.

In some examples of the apparatus, the determination may be by the radio processor while the host processor is in the sleep state. In some examples, the apparatus includes means for detecting that the second access point is in the second subnet and means for awakening the host processor from the sleep state based at least in part on the detection that the second access point is in the second subnet. In some examples, the apparatus includes means for determining network information for the second subnet and means for storing the network information for the second subnet in the memory. In some cases, the means for storing the network information in the memory include means for caching the network information in firmware.

In some examples, the means for identifying the second access point includes means for initiating roaming to the second access point. In some cases, the apparatus includes means for receiving an incoming packet at the apparatus from the second access point. The apparatus may include means for storing the network information for the second subnet in the memory and means for processing the incoming packet based at least in part on the stored network information for the second subnet. In some cases, the host processor may be configured to awaken from a sleep state in response to receipt of the incoming packet.

In some examples, the apparatus includes means for initiating an address resolution process to determine whether the second access point is in the first subnet or the second subnet. In some cases, apparatus includes means for determining that the host processor has awakened from a sleep state during the address resolution process and means for terminating the address resolution process based at least in part on the determination that the host processor has awakened from the sleep state. In some cases, the apparatus includes means for detecting that the second access point is in the same subnet as the first access point and means for allowing the host processor to remain in a sleep state based at least in part on the detection.

In some examples, the means for determining the whether the second access point is in the first subnet or the second subnet include means for sending an address information request using the stored network information, means for detecting that the address information request has failed, and means for determining that the second access point is in the second subnet based at least in part on the failed address information request. In some cases, the address information request is at least an ARP request, or a neighbor solicitation request, or a combination thereof. In some cases, the means for determining whether the second access point is in the second subnet include means for sending an address information request using the stored network information, means for receiving a response to the address information request, and means for determining that the second access point is in the first subnet based at least in part on the response to the address information request.

In some cases, the stored network information includes gateway information associated with the first subnet, the gateway information comprising at least one of a gateway IP address, or a gateway MAC address, or a gateway address type, or a combination thereof. In some examples, the apparatus includes means for performing a DHCP process to determine the network information for the first subnet.

A non-transitory computer-readable medium storing code for wireless communication is described. The code may include instructions executable to communicate between a station and a first access point that is included within a first subnet, wherein the station includes a radio processor and a host processor, store, by the station, network information for the first subnet in memory, identify, by the station, a second access point, and determine, by the radio processor without communication between the radio processor and the host processor during the determination, whether the second access point is in the first subnet or a second subnet based at least in part on the stored network information.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

Aspects of the disclosure are described in reference to the following figures.

DETAILED DESCRIPTION

Figure 1:
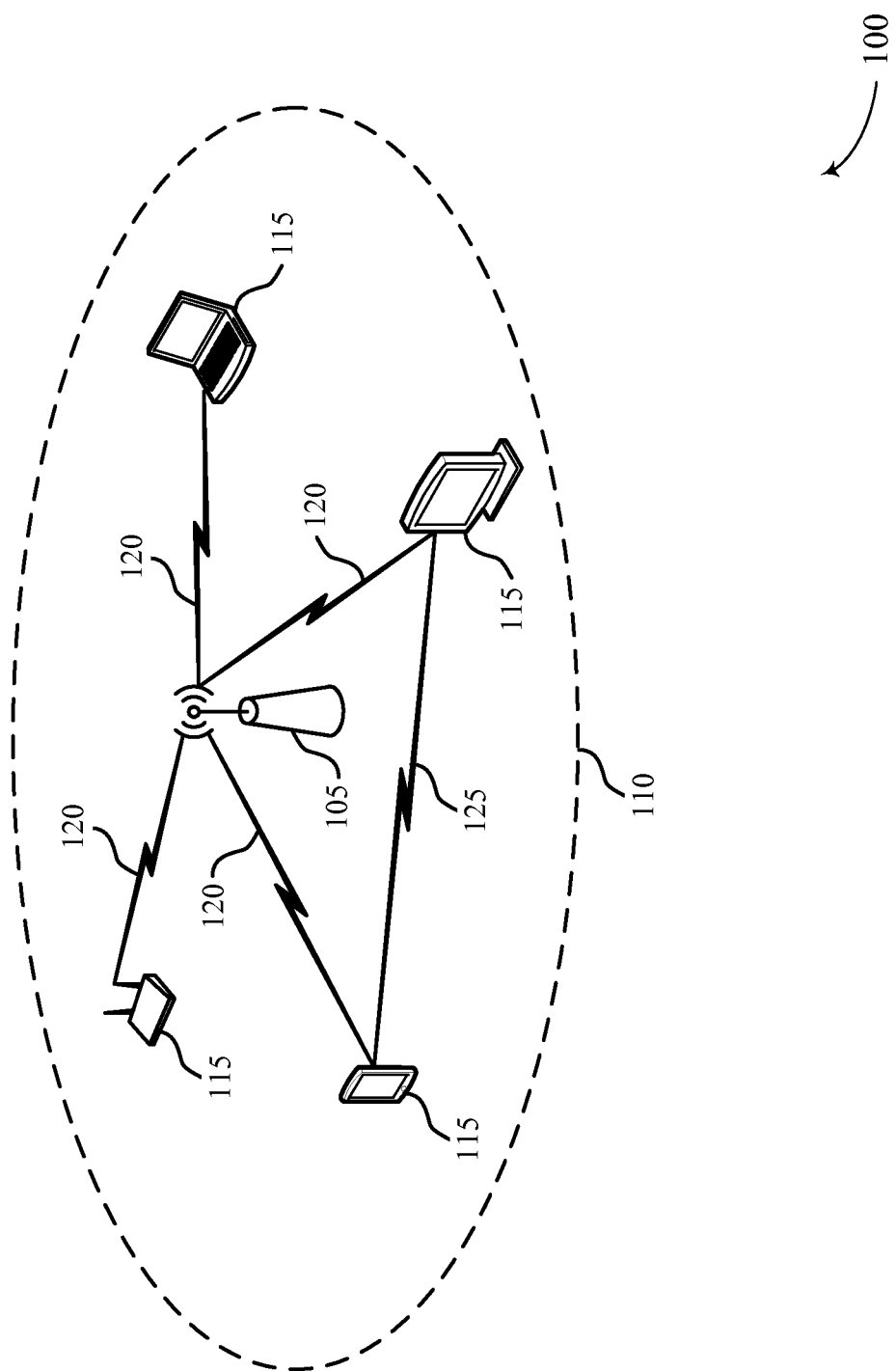
FIG. 1 illustrates a wireless communications system for inter-subnet and intra-subnet roaming configured in accordance with various aspects of the present disclosure.

A station (STA) may use network information for a subnet to communicate with an access point (AP) in the subnet. The subnet may include multiple APs and be part of a wireless local area network (WLAN) that includes multiples subnets. Each subnet may include one or more gateways that route packets within the subnet and between the subnet and other subnets of the WLAN. A gateway may be identified at the network layer by an Internet Protocol (IP) address and at the data link layer by a media access control (MAC) address. The type of gateway IP address may be IPv4 or IPv6. A host processor included in a STA may determine the network information (e.g., STA IP address, gateway IP address, gateway MAC address, and gateway IP address type) for a first subnet. The network information may be determined upon initial connection to an AP in the first subnet. A STA may change association (e.g., a connection) from a first AP to a second AP, which may be referred to as roaming. The second AP may be in the same subnet as the first AP, or in a different subnet.

When a STA roams between APs in the same subnet the network information may remain valid. However, the STA may not recognize such a scenario and expend power retrieving unnecessarily the redundant network information. In order to avoid expending that power, the host processor of the STA may, prior to roaming, store the network information in memory (e.g., cache the network information in firmware) of the STA. The host processor may then use the stored network information when the STA connects to a different AP in the same subnet as the pre-roaming AP, which may conserve power. In addition to the host processor, the STA may use a radio processor to facilitate roaming. But using two processors while roaming may consume excess power. Accordingly, one of the processors (e.g., the host processor) may enter a sleep state during roaming and the other processor (e.g., the radio processor) may remain awake to facilitate the roaming. A processor (e.g., the host processor) that is in the sleep state may use low power and have limited functionality compared to the awake state. A STA or a processor of a STA may also have multiple different sleep states, e.g., corresponding to different limited functionality or levels of functionality. Thus, the STA may conserve power by using a single processor, fewer processors, or a limited portion of one or more processors during roaming and allowing the other processor to be in a sleep state.

In some cases, the STA may receive a packet from the post-roaming subnet before the network information for the post-roaming subnet has been determined. In such cases, rather than wirelessly retrieving the network information for the new subnet upon awakening from the sleep state, the host processor of the STA may internally retrieve the network information from the memory of the STA. Internally retrieving the network information may be faster than wirelessly retrieving the network information, and thus may reduce a delay in communication of the received packet.

In still other cases, an AP may give the IP address that a STA was using to another device after the STA roams to an AP in a different subnet. The AP may then circulate packets for the other device using the IP address previously assigned to the STA. If the STA performs roaming again and reconnects to an AP in the original subnet (which may be the original AP), the STA may receive the packets intended for the other device until the STA updates its network information (e.g., the STA's own IP address). Receiving packets intended for a different recipient STA may consume time, power, and processing resources of the STA. The STA may reduce the reception of such packets by updating the network information when the subnet change is detected rather than waiting to receive the incoming packets.

After roaming, the radio processor included in the STA may determine if the roaming was within a subnet (intra-subnet roaming) or between subnets (inter-subnet roaming). For example, the radio processor may send an address information request that includes the stored subnet information to the post-roaming subnet gateway. If the address information request succeeds the radio processor may determine that intra-subnet roaming has occurred (i.e., the post-roaming AP is in the same subnet as the pre-roaming AP). In such a scenario, the stored network information is valid for the post-roaming subnet and the radio processor may allow the host processor to stay in the sleep state. In an alternative scenario, the address information request fails and the radio processor determines that inter-subnet has occurred (i.e., the post-roaming AP is in a different subnet than the pre-roaming subnet). In such a case, the radio processor may awaken the host processor to update the stored network information with network information for the post-roaming subnet. In some cases, the network information for the post-roaming subnet may be stored in addition to the network information for the pre-roaming subnet. The host processor may use the stored network information when processing incoming or outgoing packets.

Aspects of the disclosure are initially described in the context of a wireless communication system. Specific examples are then described for inter-subnet and intra-subnet roaming. These and other aspects of the disclosure are further illustrated by and described with reference to apparatus diagrams, system diagrams, and flowcharts that relate to inter-subnet and intra-subnet roaming.

FIG. 1 illustrates a wireless communication system 100 configured in accordance with various aspects of the present disclosure. The wireless communication system 100 may be a wireless location area network (WLAN) that includes an AP 105 and multiple associated STAs 115. The STAs 115 may represent devices such as mobile stations, personal digital assistant (PDAs), other handheld devices, netbooks, notebook computers, tablet computers, laptops, display devices (e.g., TVs, computer monitors, etc.), printers, etc. The various STAs 115 in the network are able to communicate with one another through the AP 105. Also shown is a coverage area 110 of the AP 105, which may represent a basic service area (BSA) of the wireless communication system 100.

Although not shown in FIG. 1, a STA 115 may be located in the intersection of more than one coverage area 110 and may associate with more than one AP 105. A single AP 105 and an associated set of STAs 115 may be referred to as a basic service set (BSS). An extended service set (ESS) is a set of connected BSSs. A distribution system (DS) (not shown) may be used to connect APs 105 in an ESS. In some cases, the coverage area 110 of an AP 105 may be divided into sectors (also not shown). The wireless communication system 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical (PHY) and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100.

The wireless communication system 100 may include multiple subnets (not shown) that make up a network. Communications from one network to another network may include the address of the source and destination networks, as well as the address for each end device. For example, an inter-network or intra-network communication may include an Internet Protocol (IP) address that includes the destination network number, the destination subnet number, and the destination device number. Each subnet in a wireless communication may share a single network number. A subnet maybe identified from other subnets by using a unique subnet number in the IP address. A subnet may include wireless devices in the same area that use the same subnet number. Each subnet may be associated with a gateway (e.g., a router) that is responsible for passing packets within and between subnets. To access a subnet, a wireless device may need to know certain network information associated with the subnet. For example, the wireless device may need to know the IP address of the gateway associated with the subnet, the media access control (MAC) address of the gateway, and the type of gateway IP address (e.g., IPv4 or IPv6). In some cases, wireless communication system 100 is an individual subnet and includes multiple APs 105.

The STAs 115 may be mobile devices that move within and about wireless communication system 100. For example, a STA 115 may change locations within coverage area 110 or leave the coverage area 110 entirely. In some cases, a mobile STA 115 experiences degradation of service from its serving AP 105 (e.g., due to increased separation and/or decreased channel conditions). In such a scenario, the STA 115 may detect the service degradation and decide to connect to a different AP 105 (e.g., one that provides a more reliable connection). That is, the STA 115 may perform roaming, which is a change of AP association from one AP 105 to another AP 105. In some cases, the STA 115 may connect to an AP 105 that is within the same subnet as the previous AP 105. Such roaming may be referred to as intra-subnet roaming (e.g., AP roaming or Layer 2 roaming). In other cases, the STA 115 may connect to an AP 105 that is in a different subnet than the previous AP 105. Such roaming may be referred to as inter-subnet roaming (e.g., Layer 3 roaming). In some examples, a STA 115 may identify an AP 105 that is different from the AP 105 currently serving the STA 115.

The STA 115 may initiate and complete the transition from one AP 105 to another AP 105 (e.g., initiate and complete roaming) using a host processor and a radio processor, each of which is included in the STA 115. A host processor may be responsible for, among other things, packet processing and obtaining network information (e.g., gateway credentials such as the gateway MAC address, IP address, and IP address type) for a STA 115 regarding a subnet. For example, the host processor may use Dynamic Host Configuration Protocol (DHCP) to determine the network information for a subnet (e.g., a pre-roaming subnet and/or a post-roaming subnet). DHCP is a client/server protocol that may automatically provide a client with network information from a DHCP server. The DHCP server may maintain a pool of IP addresses and dynamically lease them out to new devices that enter the network. Thus, the DHCP server may provide a valid gateway IP address to a STA 115 when STA 115 enters a subnet. The DHCP server may also provide other network information such as the gateway IP address type and the MAC address of the gateway to the STA. Thus, the network information may include information that is used by the STA to communicate with the gateway. In some cases, the DHCP server may provide additional information (e.g., DHCP options) such as subnet mask IP addresses, IP address for routers, IP address for domain name server (DNS), DNS domain name, cookie servers, resource location servers, host name for the STA, etc.

The radio processor may be associated with one or more radio access technologies (RATs) and may support communications over the respective RATs. For example, the radio processor may be a WLAN radio processor that facilitates address resolution when the STA 115 moves between subnets during roaming. Address resolution may be the process of mapping or converting a network address (e.g., an IPv4 or IPv6 address) of a device to a hardware address (e.g., a MAC address). For instance, a gateway that receives an incoming packet with a destination IP address may determine the corresponding hardware device address (e.g., a MAC address) in an address resolution process so that the packet may be sent to the correct device. Address Resolution Protocol (ARP) may be used for IPv4 address resolution and Neighbor Solicitation may be used for IPv6 address resolution. In ARP, a device (e.g., a STA 115) may broadcast an ARP request that indicates the IP address that is in need of resolution. The device that corresponds to the IP address may recognize the IP address as its own and reply to the device that sent the ARP request with an indication of the MAC address corresponding to the IP address. In Neighbor Solicitation, a device (e.g., a STA 115) may multicast a Neighbor Solicitation request which initiates a substantially similar process as ARP. In some cases, a STA 115 may determine if roaming has led to a subnet change by sending an address information request (e.g., an ARP request or a Neighbor Solicitation request) to the subnet gateway.

The host processor and the radio processor may be separate or co-located. The host processor and radio processor may be capable of accessing the same memory, either directly or indirectly. That is, the host processor may store information (e.g., network information) in memory and the radio processor may access the stored information. In some examples, the radio processor may be associated with firmware corresponding to the RAT(s) supported by the radio processor. For instance, a WLAN radio processor may be in communication with WLAN firmware that controls basic low-level functions (e.g., WLAN network connectivity) and provides services to higher-level software. In some cases, the host processor may indirectly interact with the firmware via communications with other components/layers of the STA 115 (e.g., through interactions with the radio processor and/or other intervening components/layers).

Thus, the host processor may store information, such as network information, in memory that corresponds to the radio processor (or in memory accessible by the radio processor). Such storing may enable an offloading of responsibilities from the host processor to the radio processor, which may allow the host processor to enter a low power mode (e.g., a sleep state) during roaming. For example, the host processor may store network information for a subnet prior to roaming. While roaming, the radio processor may use the stored network information to manage certain roaming tasks, such as subnet detection, while the host processor is in a sleep state. A host processor that is in the sleep state may consume less power and processing resources. In some cases (e.g., when the STA 115 changes subnets), the radio processor may interrupt the host processor sleep state so that the host processor may prepare for future communications (e.g., by fetching network information). Accordingly, the host processor may be ready to process incoming/outgoing packets as soon as they arrive, which may reduce latency.

Figure 2A:
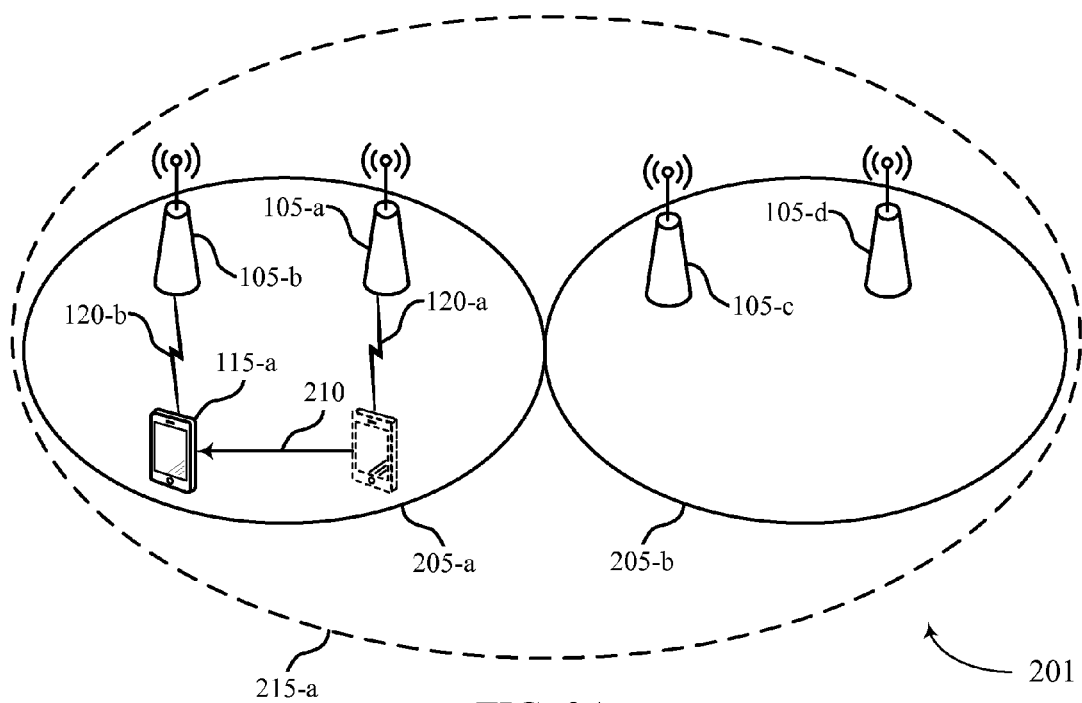
FIG. 2A illustrates an example of a wireless communications subsystem that supports inter-subnet and intra-subnet roaming in accordance with various aspects of the present disclosure.

FIG. 2A illustrates an example of a wireless communications subsystem 201 for inter-subnet and intra-subnet roaming in accordance with various aspects of the present disclosure. Wireless communications subsystem 201 may have a coverage area 215-a. Wireless communications subsystem 201 may be an example of a WLAN network, and may include STA 115-*a* and AP 105-*a* to AP 105-*d*, which may be examples of a STA 115 and an AP 105 described with reference to FIG. 1. Wireless communications subsystem 201 may also include two subnets: subnet 205-*a* and subnet 205-*b*. Each subnet may be associated with a different gateway (not shown) and different network information (e.g., gateway credentials such as the gateway MAC address, IP address, and IP address type). Wireless communications subsystem 201 shows an example of intra-subnet roaming.

STA 115-*a* may be communicatively coupled to AP 105-*b* via communication link 120-*a*. STA 115-*a* may make a location change 210 within subnet 205-*a*. During the location change 210, STA 115-*a* may experience a reduction in service or connection quality from AP 105-*a*. Accordingly, STA 115-*a* may identify AP 105-*b* and switch connections from AP 105-*a* to AP 105-*b*. STA 115-*a* may perform measurements of signals from AP 105-*b* prior to establishing a connection with AP 105-*b*. For example, STA 115-*a* may measure signals from AP 105-*b* and determine that AP 105-*b* provides more reliable service or a better connection than AP 105-*a*. Based on the determination, STA 115-*a* may perform intra-subnet roaming from AP 105-*a* to AP 105-*b*. That is, STA 115-*a* may drop its connection with AP 105-*a* and establish a connection with AP 105-*b*. After the roaming, STA 115-*a* may use communication link 120-*b* to exchange signals with AP 105-*b*. In some cases, STA 115-*a* may identify and/or switch connections to AP 105-*b* irrespective of location change.

Prior to location change 210 (and the subsequent roaming), the host processor of STA 115-*a* may store the network information for subnet 205-*a* in memory accessible to the radio processor (e.g., STA 115-*a* may cache the network information in firmware associated with the radio processor). The network information may have been obtained by the host processor upon initial connection with AP 105-*a* (e.g., by using DHCP). After storing the network information, the host processor may enter a sleep state during location change 210. In the sleep state, the host processor may have limited functionality and use low power (compared to the awake state). During location change 210, the radio processor may be responsible for managing roaming activities. For example, the radio processor may facilitate connection to AP 105-*b*. After the connection has been established, the radio processor may determine if the roaming has resulted in an intra-subnet or inter-subnet AP change (e.g., the radio processor may detect if AP 105-*b* is in the same subnet as AP 105-*a*).

The radio processor may detect the type of roaming by sending an address information request (e.g., an ARP request or a Neighbor Solicitation request) to the gateway via AP 105-*b* for subnet 205-*a*. The address information request may be sent during the initial connection setup and may include at least some of the network information stored in the memory (e.g., the gateway IP address). Because AP 105-*b* is in the same subnet as AP 105-*a*, the stored network information (e.g., gateway IP address) remains valid and the gateway responds with an address information reply (e.g., an ARP reply or a Neighbor Solicitation response) that includes the hardware address (e.g., MAC address) corresponding to the gateway IP address. Based on the response to the address information request, the radio processor may determine that AP 105-*b* is in the same subnet as AP 105-*a* (i.e., the radio processor may determine that the location change 210 resulted in intra-subnet roaming). Accordingly, the radio processor may allow the host processor to remain in sleep state (e.g., the radio processor may refrain from awakening the host processor) until the radio processor detects a packet for communication has been received at STA 115-*a* (or until some other event that may require the host processor).

Figure 2B:
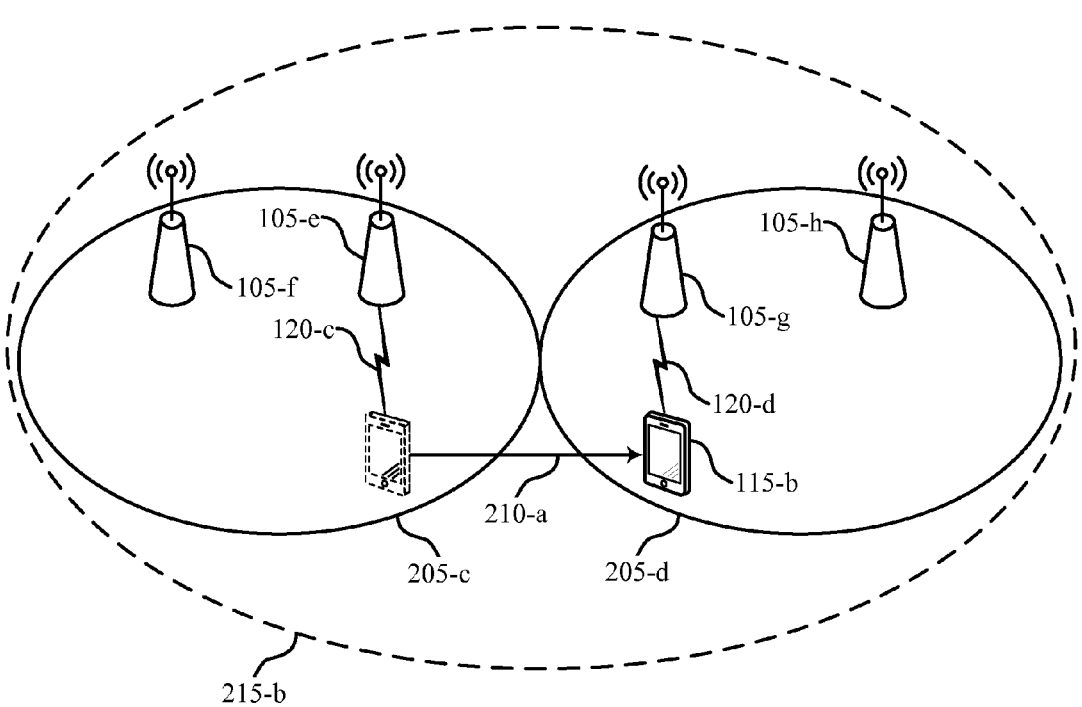
FIG. 2B illustrates an example of a wireless communications subsystem that supports inter-subnet and intra-subnet roaming in accordance with various aspects of the present disclosure.

In some cases, STA 115-*a* may exercise inter-subnet roaming, such as shown in FIG. 2B. FIG. 2B illustrates an example of a wireless communications subsystem 202 for inter-subnet and intra-subnet roaming in accordance with various aspects of the present disclosure. The wireless communications subsystem 202 includes subnet 205-*c* and subnet 205-*d*, which may be within the coverage area 215-*a* of the wireless communications subsystem 202. AP 105-*e* and 105-*f* are included in subnet 205-*c* and AP 105-*g* and AP 105-*h* are included in subnet 205-*d*. Subnet 205-*c* may have different network information than subnet 205-*d*.

STA 115-*b* may establish a connection with AP 105-*e* and communicate with AP 105-*e* using communication link 120-*c*. Upon initial connection with AP 105-*e* the host processor may determine the network information for subnet 205-*c* (e.g., by using DHCP). Prior to location change 210-*a*, the host processor may store the network information in memory (e.g., the host processor may cache the network information in firmware associated with the radio processor) and enter a sleep state. During location change 210-*a* the radio processor may be responsible for certain roaming activities. For example, the radio processor may determine that AP 105-*g* provides better service than AP 105-*e*, drop the connection with AP 105-*e*, and establish a connection with AP 105-*g* (i.e., STA 115-*b* may perform inter-subnet roaming). Thus, the radio processor may initiate roaming. After location change 210-*a* STA 115-*b* may communicate with AP 105-*g* via communication link 120-*d*.

Upon initial connection with AP 105-*g* the radio processor may use the subnet 205-*c* network information that is stored in memory (e.g., cached in firmware) to send an address information request. The address information request may be an ARP request or a Neighbor Solicitation request, depending on the type of gateway IP address that is stored. Because AP 105-*g* is in a different subnet than AP 105-*e*, the network information (e.g., gateway IP address, etc.) is not valid. Accordingly, the radio processor may not receive a response to the address information request (i.e., the address information request may fail). The radio processor may detect that the address information request has failed and determine that a subnet change has occurred (i.e., the radio processor may determine that AP 105-*g* is in a different subnet than AP 105-*e*).

An address information request may be categorized as a failed address information request if a response to the address information request is not received within a predetermined threshold amount of time after transmission of the address information request. For example, an address information request may have a failure timeout of ten seconds (e.g., the address information request may be categorized as a failed address information request if it fails to elicit a response within ten seconds of the request). In some cases, the radio processor may detect the subnet change if the number of failed address information requests exceeds a predetermined failure threshold (e.g., the radio processor may determine that there has been a subnet change if four consecutive address information requests fail). In some cases, the address information request may be sent at a low rate to improve reliability.

Based on the detection of the subnet change, the radio processor (or some other component of STA 115-*b*) may awaken the host processor (e.g., the radio processor may signal the host to change from a sleep state to an awake state). The host processor may subsequently determine the network information (e.g., gateway IP address, gateway IP address type, and gateway MAC address) for subnet 205-d. After the network information has been determined (e.g., via DHCP), the host processor may store the network information in memory (e.g., cache in firmware). In one example, the host processor may update the stored network information using the network information for subnet 205-d. Thus, the network information for subnet 205-c may be replaced by the network information for subnet 205-d. In another example, the host processor may add the network information for subnet 205-d to a database or lookup table that includes the network information for other subnets (e.g., subnet 205-c). Thus, STA 115-b may accumulate network information for multiple subnets. After storing the network information the host processor may enter a sleep state. Thus, the host processor may be prepared to process a packet upon leaving the sleep state by using the stored network information (without going through a DHCP process). Processing a packet may include preparing an incoming packet to be passed to other components/layers of STA 115-b or preparing an outgoing packet for transmission.

For example, the host processor may be in a sleep state when the radio processor detects a packet that is ready for communication. The packet may be an incoming or outgoing packet. Based on the detection of the packet, the radio processor may awaken the host processor. The host processor may use the stored network information for subnet 205-d when processing the packet. Thus, the host processor processes the packet without performing a DHCP process, which may improve latency. After the host processor has processed the packet, the host processor may re-enter the sleep state.

Figure 3:
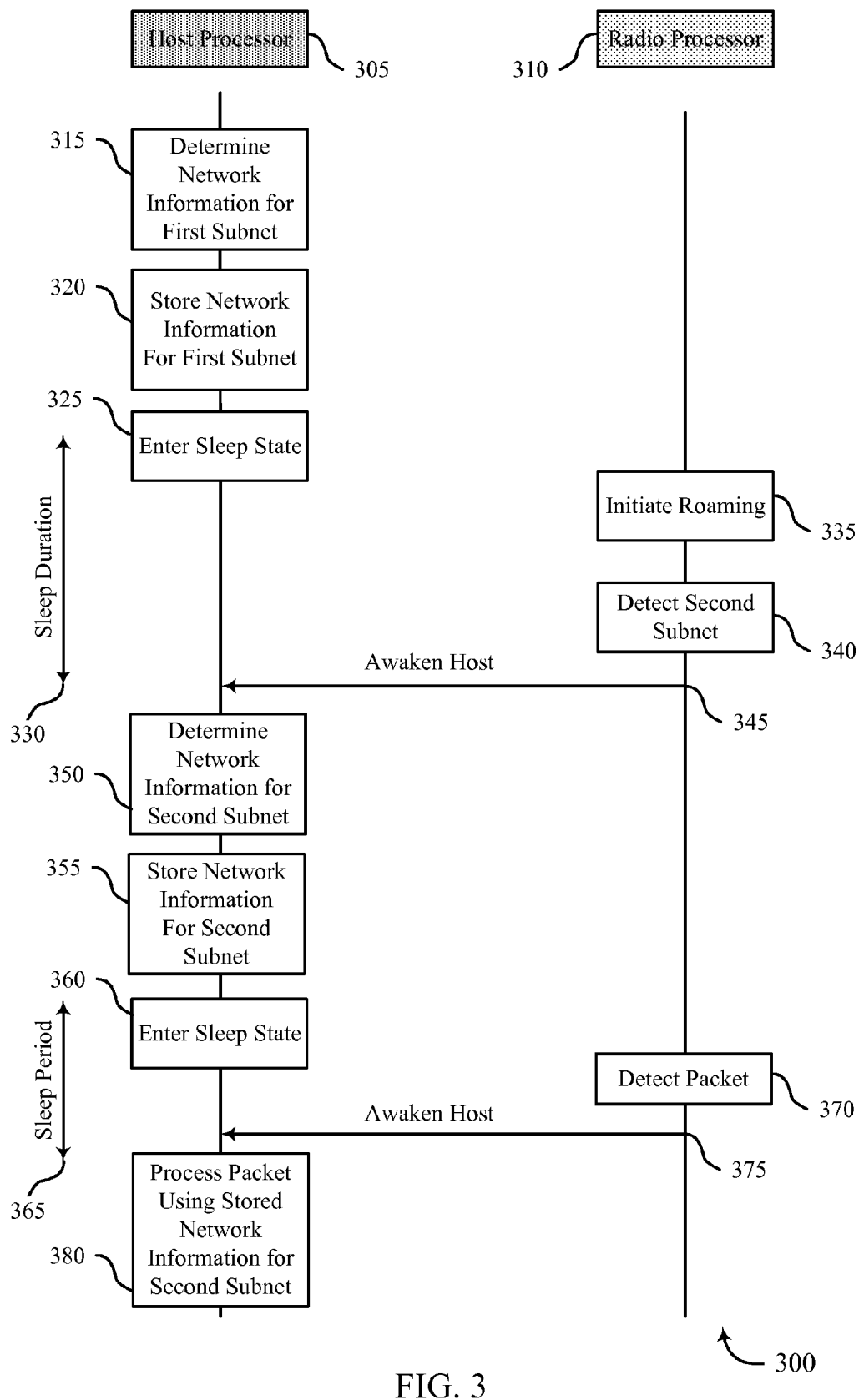
FIG. 3 illustrates an example of a process flow that supports inter-subnet and intra-subnet roaming in accordance with various aspects of the present disclosure.

FIG. 3 illustrates an example of a process flow 300 for inter-subnet and intra-subnet roaming in accordance with various aspects of the present disclosure. Process flow 300 may be performed by at least a host processor 305 and a radio processor 310, which may be examples of a host processor and radio processor as described with reference to FIGS. 1 and 2. The host processor and radio processor may be included in a STA 115, which may be an example of a STA 115 described with reference to FIGS. 1-2. The STA 115 may be located in a first subnet that is associated with a gateway that has network information such as a gateway IP address, a gateway IP address type, and a gateway MAC address. Process flow 300 may be an example of actions performed by a host processor and a radio processor when inter-subnet roaming occurs. For example, the STA 115 may switch connection from an AP 105 in a first subnet to an AP 105 in a second subnet.

At 315, the host processor may determine the network information for the first subnet. For example, the host processor may determine the network information using DHCP upon initial connection to the AP 105 in the first subnet. Thus, the STA 115 may be in communication with the AP 105 in the first subnet. At 320, the host processor 305 may store the network information for the first subnet in memory. For example, the host processor 305 may store the network information for the first subnet in firmware corresponding to the radio processor 310. The network information may be stored periodically or upon a trigger. For example, the host processor 305 may store the network information when it is determined that a location change is imminent or when there is a detection of decreasing communication quality. After storing the network information, and at 325, the host processor 305 may enter a sleep state. The host processor 305 may remain in the sleep state until awakened by the radio processor 310 or other component of the STA 115 (e.g., the host processor may in the sleep state for sleep duration 330).

While the host processor 305 is in the sleep state, and at 335, the radio processor 310 may initiate roaming. For example, the radio processor 310 may detect a change in location or a change communication quality and determine that there is a need for roaming. Accordingly, the radio processor 310 may facilitate connection to an AP 105 in a second subnet. In some cases, the radio processor may identify an AP 105 in the second subnet prior to roaming. At 340, the radio processor 310 may detect that the second subnet is different from the first subnet (e.g., the radio processor may determine that inter-subnet roaming has occurred). Thus, the radio processor 310 may determine, without communication with the host processor, whether the AP 105 is in the first subnet or the second subnet. In one example the radio processor 310 may, upon initial connection with the AP 105 in the second subnet, send an address information request (e.g., an ARP request or a Neighbor Solicitation request) to the gateway corresponding to the second subnet. The radio processor 310 may determine that there has been a subnet change (i.e., there has been inter-subnet roaming) when an address information request sent to the previously serving AP fails to elicit a response (e.g., the STA may wait a predetermined period of time for an address information response, and not receive such response before the predetermined period expires).

After detecting the subnet change, the radio processor 310 may awaken the host processor 305 at 345. In some cases, the radio processor 310 may indicate the subnet change to the host processor 305 (e.g., the radio processor 310 may indicate to the host processor 305 that the stored network information is not valid). Accordingly, the awakened host processor 305 may determine, at 350, the network information for the second subnet (e.g., via DHCP). At 355, the host processor 305 may store the network information for the second subnet. The network information may also be cached in firmware that corresponds to the radio processor 310. In some examples, the host processor 305 may update the stored network information using the network information for the second subnet. In other examples, the host processor may store the network information for the second subnet and retain the network information for the first subnet. At 360, the host processor 305 may re-enter the sleep state. The host processor 305 may be in the sleep state until awakened by another component (e.g., the radio processor 310) of the STA 115. For example, the host processor 305 may be in the sleep state for sleep duration 365). Thus, the radio processor 310 may interrupt the sleep state of the host processor 305 to prepare for future packets by preemptively obtaining network information for the second subnet prior to packet arrival.

At 370 the radio processor 310 may detect a packet. The packet may be an incoming (i.e., received) packet or an outgoing (i.e., pending for transmission) packet. The radio processor 310 may detect the packet directly (e.g., independent of communications with other components of STA 115) or indirectly (e.g., via communications with other components of the STA 115). Based on the detection of the packet, and at 375, the radio processor 310 may awaken the host processor 305. In some cases awakening the host processor 305 includes directly signaling the host processor or facilitating signaling by another component. At 380 the host processor 305 may process the packet using the stored network information for the second subnet. Thus, rather than using DHCP, the host processor 305 may internally retrieve the network information from firmware, which, among other benefits, may decrease delay in processing the packet. In some cases, the host processor 305 does not enter a sleep state during sleep duration 330 and sleep duration 365 and instead performs processing operations (e.g., operations unrelated to roaming). That is, roaming responsibilities may be offloaded from host processor 305 to the radio processor 310, allowing processing resources of the host processor 305 to be used for other tasks.

Figure 4:
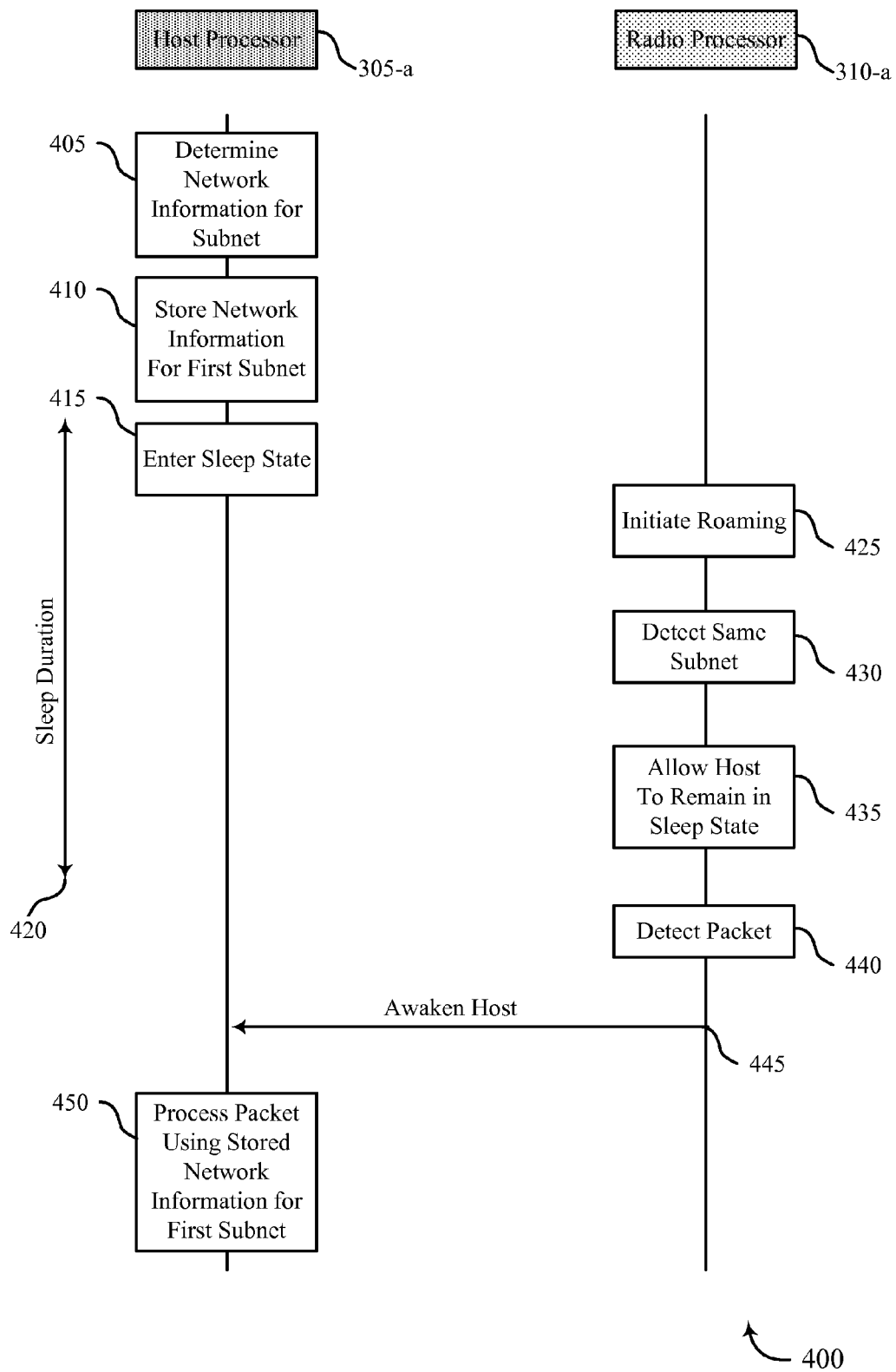
FIG. 4 illustrates an example of a process flow that supports inter-subnet and intra-subnet roaming in accordance with various aspects of the present disclosure.

FIG. 4 illustrates an example of a process flow 400 for inter-subnet and intra-subnet roaming in accordance with various aspects of the present disclosure. Process flow 400 may be performed by at least host processor 305-*a* and radio processor 310-*a*, which may be examples of a host processor 305 and radio processor 310 described with reference to FIG. 3. Host processor 305-*a* and radio processor 310-*a* may be included in a STA 115. The STA 115 may perform intra-subnet roaming. For example, the STA 115 may switch connectivity from a first AP 105 to a second AP 105 in the same subnet.

At 405, host processor 305-*a* may determine the network information for the subnet corresponding to the AP 105 with which the STA 115 is connected. Host processor 305-*a* may use DHCP to determine the network information. The network information may include a combination of the gateway IP address, the gateway IP address type, and the gateway MAC address. Thus, the STA 115 may be in communication with an AP 105 of the first subnet. At 410, host processor 305-*a* may store the network information for the first subnet in memory (e.g., the host processor 305-*a* may cache the network information for the first subnet in firmware corresponding to radio processor 310-*a*). At 415, host processor 305-*a* may enter a sleep state. Host processor 305-*a* may be in the sleep state until awakened by radio processor 310-*a* or another component of the STA 115. Thus, host processor 305-*a* may be in the sleep state for sleep duration 420. In some cases host processor 305-*a* may enter the sleep state upon the determination that there are no packets available for processing. In some cases, the host processor 305-*a* may remain awake during the sleep duration 420 and use the sleep duration 420 to perform operations that are not delegated to the radio processor 310-*a*.

At 425, radio processor 310-*a* may initiate roaming by connecting to a second AP 105. Radio processor 310-*a* may initiate roaming based on a change in location or communication quality. In some cases the radio processor 310-*a* may identify an AP 105 prior to roaming. The roaming may be intra-subnet roaming in which the STA 115 switches connectivity between a first AP 105 in the subnet and the second AP 105 in the subnet. Accordingly, at 430, radio processor 310-*a* may detect that the second AP 105 is in the same subnet as the first AP 105 (e.g., radio processor 310-*a* may detect that the post-roaming subnet is the pre-roaming subnet). Based on the determination that a subnet change has not taken place, radio processor 310-*a* may, at 435, allow host processor 305-*a* to remain in the sleep state (i.e., radio processor 310-*a* may refrain from awakening host processor 305-*a*). Thus, host processor 305-*a* may continue to conserve power during sleep duration 420 (or continue to take advantage of sleep duration 420 by allocating processing resources to tasks not assumed by the radio processor 310-*a*).

At 440, radio processor 310-*a* may detect a packet (e.g., an incoming or outgoing packet). Accordingly, radio processor 310-*a* may, at 445, awaken host processor 305-*a*. The awakening may be based at least in part on the packet detection. In some cases, radio processor 310-*a* may indicate to host processor 305-*a* that there has not been a subnet change (e.g., radio processor 310-*a* may indicate that the stored network information is still valid). Accordingly, at 450, host processor 305-*a* may process the detected packet using the network information for the subnet that is stored in memory. Thus, host processor 305-*a* may process the packet without performing a DHCP process by internally retrieving the network information from memory, which may reduce packet latency.

Figure 5:
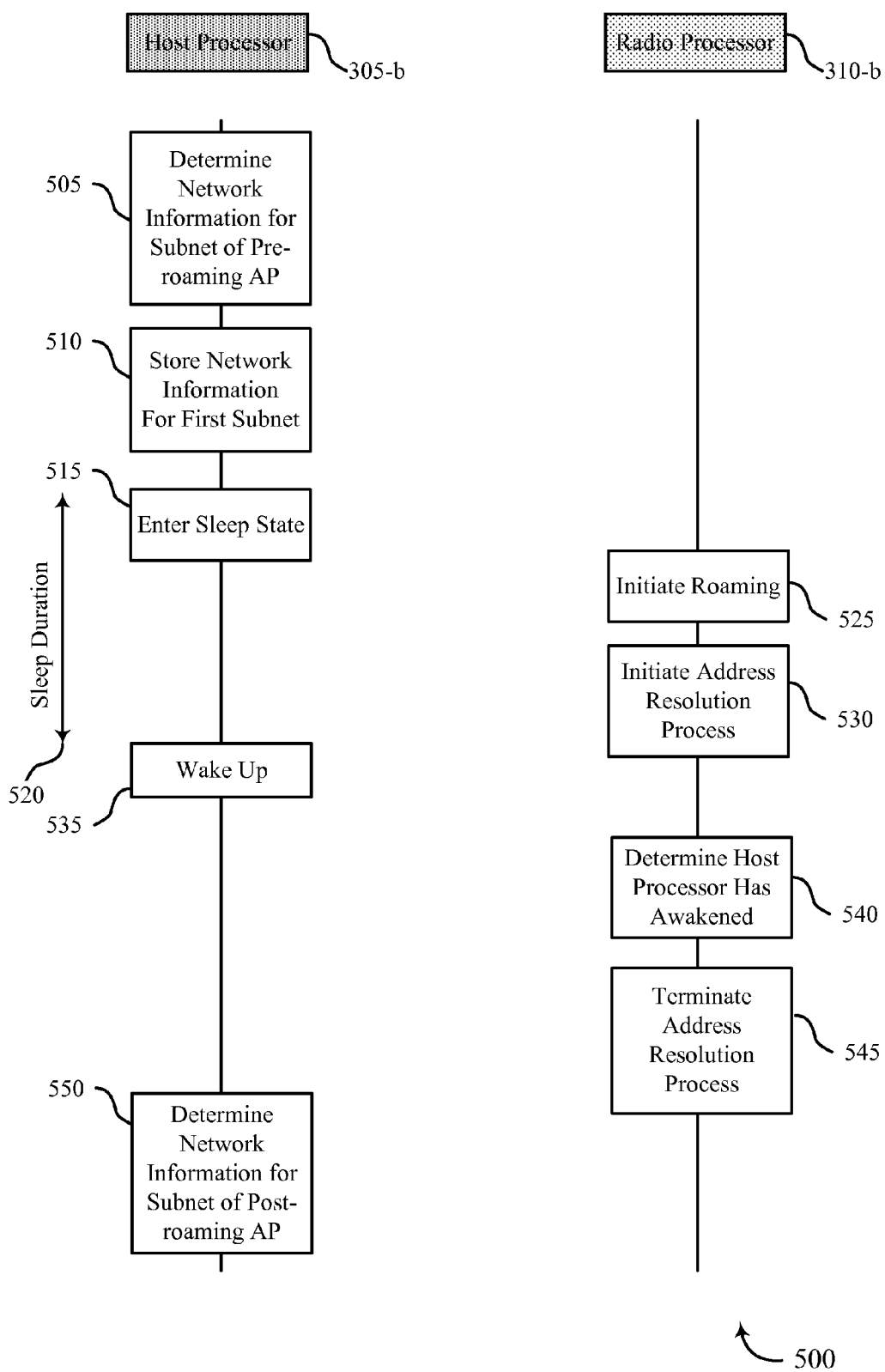
FIG. 5 illustrates an example of a process flow that supports inter-subnet and intra-subnet roaming in accordance with various aspects of the present disclosure.

FIG. 5 illustrates an example of a process flow 500 for inter-subnet and intra-subnet roaming in accordance with various aspects of the present disclosure. Process flow 500 may be performed by at least processor 305-*b* and radio processor 310-*b* as described with reference to FIGS. 3 and 4. Host processor 305-*b* and radio processor 310-*b* may be included in a STA 115. The STA 115 may change connection (e.g., roam) from a first AP to a second AP. The first AP may be referred to as a pre-roaming AP and the second AP may be referred to as a post roaming AP. The roaming may be intra-subnet or inter-subnet roaming.

At 505, host processor 305-*b* may determine network information for the subnet of the pre-roaming AP. At 510, host processor 305-*b* may store the network information in memory accessible to radio processor 310-*b* (e.g., host processor 305-*b* may cache the network information in firmware corresponding to radio processor 310-*b*). Host processor 305-*a* may enter a sleep state at 515. The sleep state may last for sleep duration 520. During sleep duration 520, radio processor 310-*b* may initiate roaming. The roaming may be intra-subnet roaming or inter-subnet roaming. After the roaming (e.g., after initial connection to the post-roaming AP 105), radio processor 310-*b* may initiate an address resolution process at 530. The address resolution process may include sending an address information request to the gateway serving the post-roaming AP 105, such as described above. At 535, host processor 305-*b* may wake up. Host processor 305-*b* may wake up independently or based on communication from another component of the STA 115. In some cases, host processor 305-*b* may wake up to scan for APs 105 that are suitable for connection.

At 540, radio processor 310-*b* may determine that host processor 305-*b* has awakened. In some cases, radio processor 310-*b* may determine that awakening of host processor 305-*b* is due to some component other than radio processor 310-*a*. At 535, radio processor 310-*b* may terminate the address resolution process. The termination may be based at least in part on the determination that host processor 305-*b* has been awakened. In some cases, radio processor 310-*b* may indicate to host processor 305-*b* that the validity of the stored credentials is unknown. Accordingly, at 550 host processor 305-*b* may determine the network information for the subnet of the post-roaming AP 105. Host processor 305-*b* may store the network information in memory and/or use the network information when processing packets.

Figure 6:
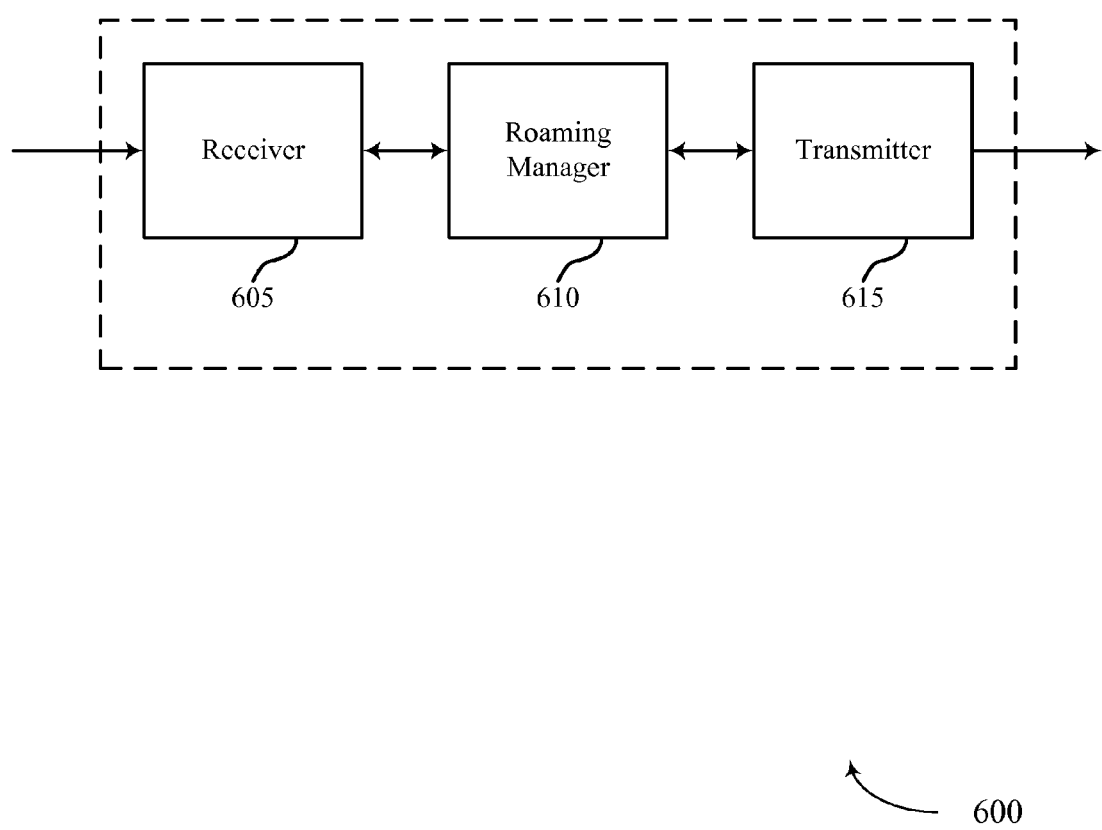
FIGS. 6-8 show block diagrams of a wireless device that supports inter-subnet and intra-subnet roaming in accordance with various aspects of the present disclosure.

FIG. 6 shows a block diagram of a wireless device 600 configured for inter-subnet and intra-subnet roaming in accordance with various aspects of the present disclosure. Wireless device 600 may be an example of aspects of a STA 115 described with reference to FIGS. 1-5. Wireless device 600 may include a receiver 605, a roaming manager 610, and/or a transmitter 615. Wireless device 600 may also include one or more processors, memory coupled with the one or more processors, and instructions stored in the memory that are executable by the one or more processors to enable the one or more processors to perform the roaming features discussed herein. Each of these components may be in communication with each other.

The receiver 605 may receive information such as packets, user data, or control information associated with various information channels (e.g., control channels, data channels, and information related to inter-subnet and intra-subnet roaming, etc.). In some cases, the receiver 605 may be used to receive information corresponding to DHCP, ARP, or Neighbor Solicitation. The receiver 605 may collaborate with other components of wireless device 600. For example, information may be passed on to the roaming manager 610, and to other components of wireless device 600.

The roaming manager 610 may store network information for a first subnet in memory (e.g., the roaming manager may cache network information for the first subnet in firmware). The first subnet may include a first AP with which the wireless device 600 is communicating. The roaming manager 610 may also determine the network information (e.g., by facilitating DHCP communications). The roaming manager 610 may identify an AP 105 different than the AP 105 currently serving the wireless device 600. In some cases, the roaming manager 610 may facilitate roaming of the wireless device 600 from the first AP to a second AP. The roaming manager 610 may determine whether the second AP is in a first subnet or a second subnet based at least in part on the stored network information (e.g., by facilitating address resolution processes involving an ARP request or Neighbor Solicitation). Roaming manager 610 may include or be included in the one or more processors.

The transmitter 615 may transmit signals received from other components of wireless device 600. The transmitter 615 may be used to send communications corresponding to DHCP, ARP, and Neighbor Solicitation. In some examples, the transmitter 615 may be co-located with the receiver 605 in a transceiver module. The transmitter 615 may include a single antenna, or it may include a plurality of antennas.

Figure 7:
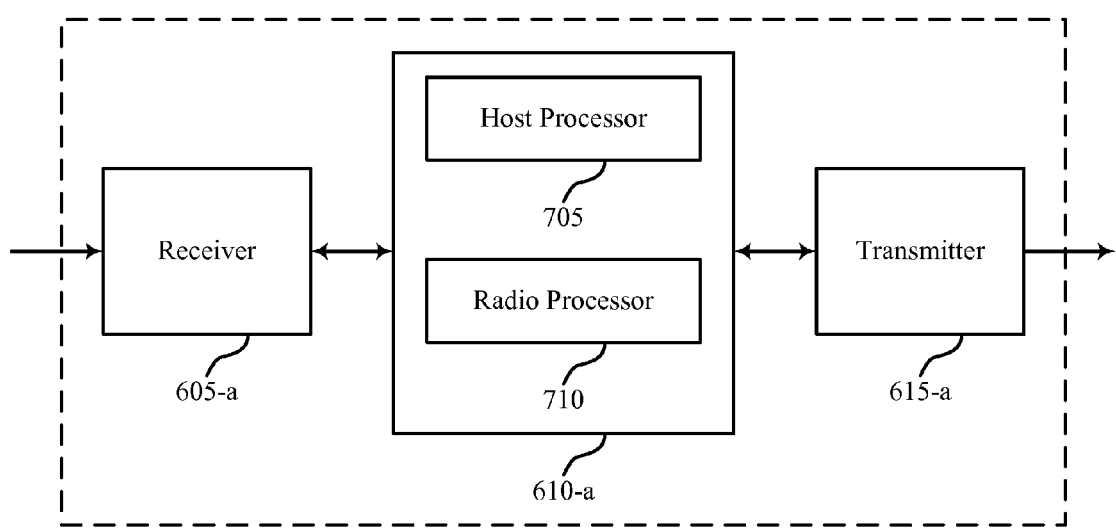

FIG. 7 shows a block diagram of a wireless device 700 for inter-subnet and intra-subnet roaming in accordance with various aspects of the present disclosure. Wireless device 700 may be an example of aspects of a wireless device 600 or a STA 115 described with reference to FIGS. 1-6. Wireless device 700 may include a receiver 605-a, a roaming manager 610-a, or a transmitter 615-a. Each of these components may be in communication with each other. The roaming manager 610-a may also include a host processor 705, and a radio processor 710.

The host processor 705 may be an example of a host processor 305 described with reference to FIGS. 3-5 and/or the one or more processors described with reference to FIG. 6. The radio processor 710 may be an example of a radio processor 310 described with reference to FIGS. 3-5 and/or the one or more processors described with reference to FIG. 6. The host processor 705 and/or radio processor 710 may be a general-purpose processor, a digital signal processor (DSP), an ASIC, an FPGA or other programmable logic device, or any combination thereof designed to perform or facilitate the operations described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The receiver 605-a may receive information which may be passed on to roaming manager 610-a, and to other components of wireless device 700. The roaming manager 610-a may perform the operations described with reference to FIG. 6. The transmitter 615-a may transmit signals received from other components of wireless device 700. Although shown included in roaming manager 610-a, the host processor 705 and the radio processor 710 may be separate. The host processor 705 and the radio processor 710 may be on or part of different chips or co-located on the same chip.

The host processor 705 may store network information for a first subnet in memory (e.g., the host processor 705 may cache network information for the first subnet in firmware). The first subnet may include a first AP with which the wireless device 700 is communicating as described with reference to FIGS. 2-5. In some examples, the stored network information includes gateway information associated with the first subnet. For example, the network information may include gateway information such as a gateway IP address, a gateway MAC address, or a gateway IP address type, or a combination thereof. In some cases the host processor 705 collaborates with the receiver 605-a and the transmitter 615-a to perform a DHCP process to determine the network information for the first subnet. In some cases, the host processor enters a sleep state after storing the network information.

The radio processor 710 may facilitate roaming from the first AP to a second AP as described with reference to FIGS. 2-5. In some cases, the radio processor 710 may identify the second AP. The radio processor 710 may also determine (while the host processor 705 is in a sleep state) whether the second AP is in a first subnet or a second subnet based at least in part on the stored network information. That is, the radio processor 710 may determine if intra-subnet or inter-subnet roaming occurred. The radio processor 710 may make the determination without communicating with the host processor 705.

The components of wireless device 600, wireless device 700, and roaming manager 610 may, individually or collectively, be implemented with at least one application specific integrated circuit (ASIC) adapted to perform some or all of the applicable functions in hardware. Alternatively, the functions may be performed by one or more other processing units (or cores), on at least one IC. In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 8:
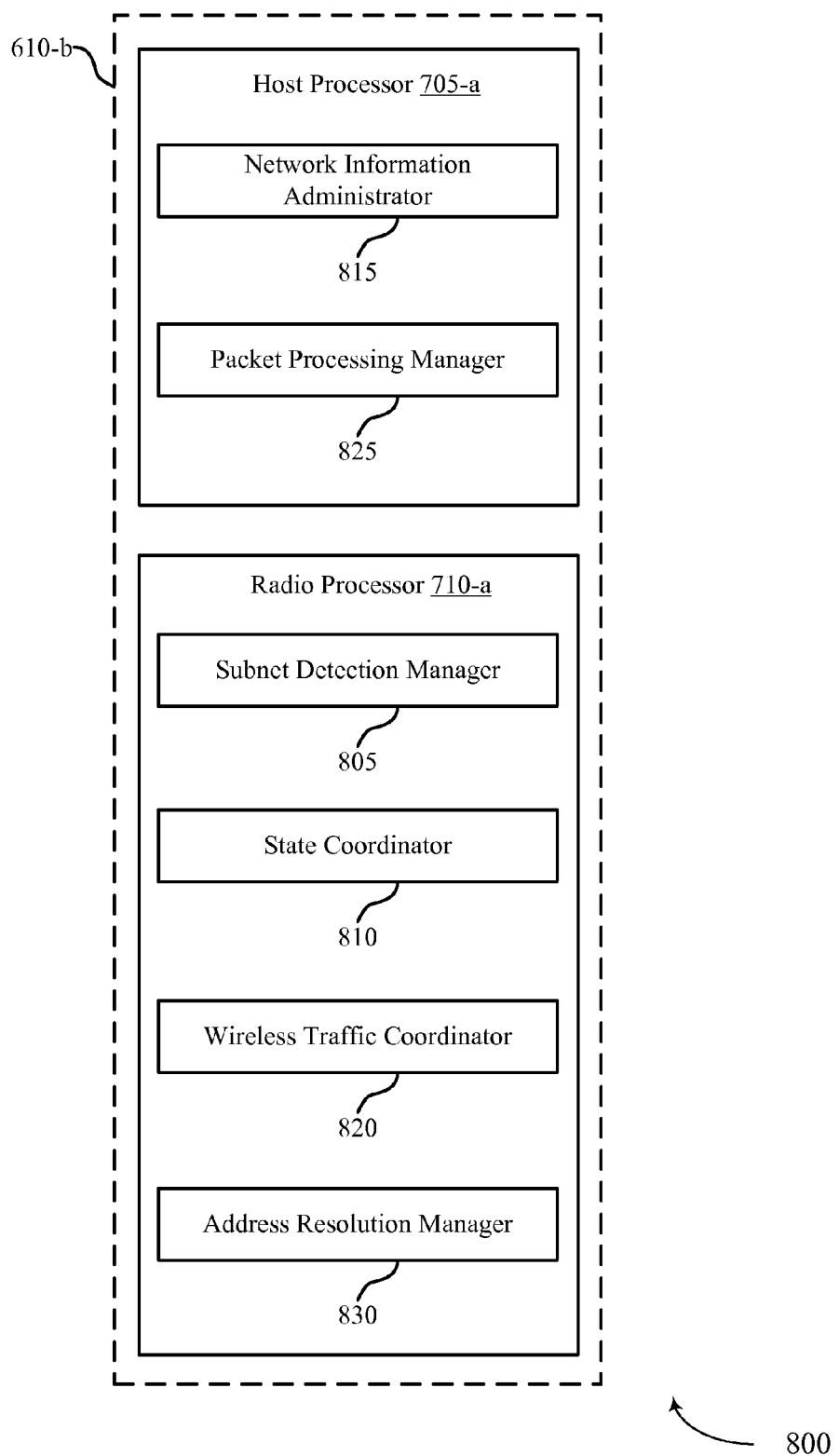

FIG. 8 shows a block diagram 800 of a roaming manager 610-b which may be a component of a wireless device 600 or a wireless device 700 for inter-subnet and intra-subnet roaming in accordance with various aspects of the present disclosure. The roaming manager 610-b may be an example of aspects of a roaming manager 610 described with reference to FIGS. 6-7. The roaming manager 610-b may include a host processor 705-a, and a radio processor 710-a. Each of these modules may perform the functions described with reference to FIG. 7. The host processor 705-a may include a subnet detection manager 805 and a packet processing manager 825. The radio processor 710-a may include a state coordinator 810, a network information administrator 815, a wireless traffic coordinator 820, and an address resolution manager 830.

As described above, a wireless device (e.g., a STA 115) may roam from a first AP associated with a first subnet to a second AP. The network information administrator 815 may determine network information for subnets. For example, prior to roaming, the network information administrator 815 may determine network information for the first subnet (e.g., by performing or facilitating a DHCP process). The network information administrator 815 may store the network information in memory accessible to the radio processor 710-*a*. In some cases (e.g., after inter-subnet roaming), the network information administrator 815 may determine network information for a second subnet associated with the second AP. The network information administrator 815 may replace or add to the stored network information using the network information for the second subnet. The network information administrator 815 may be a hardware component of the host processor 705-*a*. Alternatively, the network information administrator 815 may be software executable by the host processor 705-*a* to perform the network information operations described herein. The software may be stored in the memory of the host processor 705-*a* or in an external memory accessible by the host processor 705-*a*.

The packet processing manager 825 may process packets for communication. The packet processing manager 825 may prepare and/or transform an incoming packet to be passed to other components of the wireless device. The packet processing manager 825 may also prepare and/or transform an outgoing packet for transmission, and/or to be passed to other components of wireless device. The packet processing manager 825 may process packets using network information stored in memory (e.g., cached in firmware). For example, the packet processing manager 825 may process an incoming packet based at least in part on stored network information for the second subnet as described with reference to FIGS. 2-5. The packet processing manager 825 may be a hardware component of the host processor 705-*a*. Alternatively, the packet processing manager 825 may be software executable by the host processor 705-*a* to perform the packet processing operations described herein. The software may be stored in the memory of the host processor 705-*a* or in an external memory accessible by the host processor 705-*a*.

As described above, the wireless device may roam from a first AP associated with a first subnet to a second AP. The roaming may be intra-subnet roaming or inter-subnet roaming. Accordingly, the subnet detection manager 805 may determine whether a subnet change has or has not occurred. For example, the subnet detection manager 805 may detect whether the second AP is in a second subnet that is different from the first subnet. The determination may be based at least in part on network information for the first subnet that is stored in memory.

In one case, the subnet detection manager 805 may detect that a subnet change has not occurred by detecting that the second AP is in the same subnet as the first AP subnet as described with reference to FIGS. 2-5. In some cases, the subnet detection manager 805 may determine that the second AP is in the first subnet based at least in part on the response to the address information request (e.g., ARP request or Neighbor Solicitation request). Alternatively, the subnet detection manager 805 may detect that a subnet change has occurred by detecting that the second AP is in the second subnet that is different from the first subnet. In some cases, the subnet detection manager 805 may determine that the second AP is in the second subnet based at least in part on a failed address information request. The detection of the subnet change may serve as a trigger to awaken the host processor 705-*a*. For example, the state coordinator 810 may awaken the host processor 705-*a* based at least in part on the detection of a subnet change. The subnet detection manager 805 may be a hardware component of the radio processor 710-*a*. Alternatively, the subnet detection manager 805 may be software executable by the radio processor 710-*a* to perform the subnet detection operations described herein. The software may be stored in the memory of the radio processor 710-*a* or in an external memory accessible by the host processor 710-*a*.

The state coordinator 810 may facilitate the awakening of the host processor 705-*a* from the sleep state based at least in part on the detection as described with reference to FIGS. 2-5. The state coordinator 810 may also determine that the host processor 705-*a* has awakened from a sleep state. For example, the state coordinator 810 may detect when the host processor 705-*a* has been awakened during an address resolution process. In another example, the state coordinator 810 may detect when the host processor 705-*a* has been awakened by an incoming packet. In some cases, the state coordinator 810 may also allow the host processor to remain in the sleep state. For example, when it has been detected (e.g., by the subnet detection manager 805) that a subnet change has not occurred, the state coordinator 810 may refrain from awakening the host processor 705-*a* based at least in part on the detection. The state coordinator 810 may be a hardware component of the radio processor 710-*a*. Alternatively, the state coordinator 810 may be software executable by the radio processor 710-*a* to perform the state coordination operations described herein. The software may be stored in the memory of the radio processor 710-*a* or in an external memory accessible by the host processor 710-*a*.

The wireless traffic coordinator 820 may collaborate with a receiver to receive an incoming packet from the second AP as described with reference to FIGS. 2-5. In some examples, the host processor 705-*a* may be awakened by the incoming packet. The wireless traffic coordinator 820 may also determine the status (e.g., success) of an address information request. For example, the wireless traffic coordinator 820 may detect that an address information request has failed. Alternatively, the wireless traffic coordinator 820 may detect that an address information request has succeeded (e.g., by collaborating with a receiver to receive a response to the address information request). The wireless traffic coordinator 820 may be a hardware component of the radio processor 710-*a*. Alternatively, the wireless traffic coordinator 820 may be software executable by the radio processor 710-*a* to perform the traffic coordination operations described herein. The software may be stored in the memory of the radio processor 710-*a* or in an external memory accessible by the host processor 710-*a*.

The address resolution manager 830 may initiate an address resolution process to determine whether the second AP is in the second subnet as described with reference to FIGS. 2-5. The address resolution process may involve an address information request. In some cases, the address resolution manager 830 may terminate the address resolution process. The termination may be based at least in part on the determination that the host processor 705-*a* has been awakened. In some examples, the address resolution manager 830 may collaborate with the subnet detection manager 805 to determine whether the second AP is in the second subnet. The determination may include sending an address information request using stored network information for the first subnet. The address information request may be an ARP request or a Neighbor Solicitation request. The address resolution manager 830 may be a hardware component of the radio processor 710-*a*. Alternatively, the address resolution manager 830 may be software executable by the radio processor 710-*a* to perform the address resolution operations described herein. The software may be stored in the memory of the radio processor 710-*a* or in an external memory accessible by the host processor 710-*a*.

Figure 9:
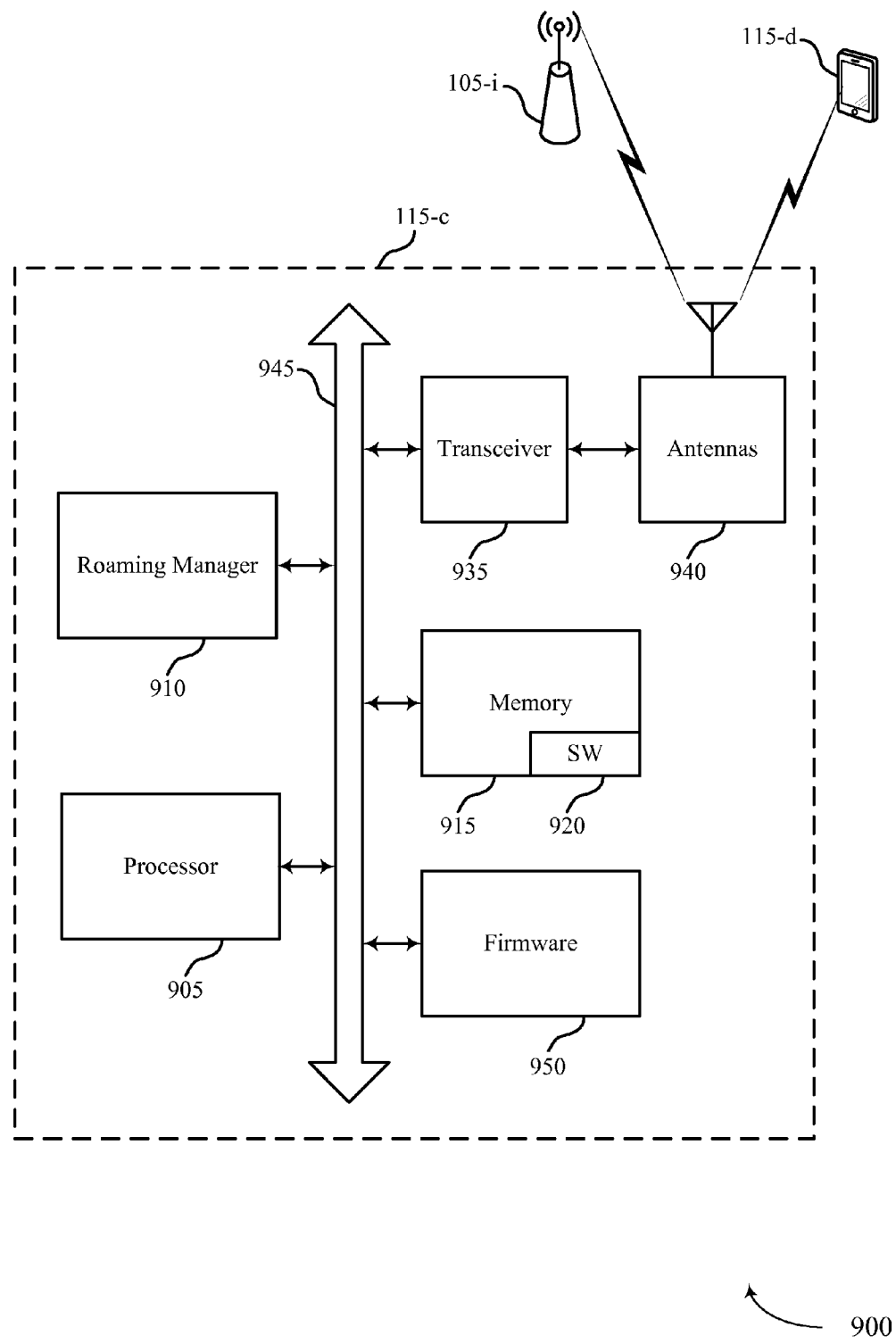
FIG. 9 illustrates a block diagram of a system including a station that supports inter-subnet and intra-subnet roaming in accordance with various aspects of the present disclosure.

FIG. 9 shows a diagram of a system 900 including a STA 115 configured for inter-subnet and intra-subnet roaming in accordance with various aspects of the present disclosure. System 900 may include STA 115-*c*, which may be an example of a wireless device 600, a wireless device 700, or a STA 115 described with reference to FIGS. 1-8. STA 115-*c* may perform intra-subnet or inter-subnet roaming. STA 115-*c* may include a roaming manager 910, which may be an example of a roaming manager 610 described with reference to FIGS. 6-8. STA 115-*c* may also include components for bi-directional voice and data communications including components for transmitting communications and components for receiving communications. For example, STA 115-*c* may communicate bi-directionally with AP 105-*i* or STA 115-*d*.

STA 115-*c* may also include a processor 905, and memory 915 (including software (SW) 920), a transceiver 935, and one or more antenna(s) 940, each of which may communicate, directly or indirectly, with one another (e.g., via buses 945). The processor 905 may, among other things, provide support to the roaming manager 910. For example, the processor 905 may provide processing support to the host processor during network information retrieval or processing support to the radio processor during roaming or during subnet change detection. In some cases, the processor 905 may be the host processor or the radio processor. In some examples, the processor 905 may include the host processor and the radio processor, which may be co-located on a single chip. STA 115-*c* may also include firmware 950, which may be an example of firmware described with reference to FIGS. 1-9. The transceiver 935 may communicate bi-directionally, via the antenna(s) 940 or wired or wireless links, with one or more networks, as described above. For example, the transceiver 935 may communicate bi-directionally with an AP 105 or another STA 115. The transceiver 935 may include a modem to modulate the packets and provide the modulated packets to the antenna(s) 940 for transmission, and to demodulate packets received from the antenna(s) 940. While STA 115-*c* may include a single antenna 940, STA 115-*c* may also have multiple antennas 940 capable of concurrently transmitting or receiving multiple wireless transmissions.

The memory 915 may include random access memory (RAM) and read only memory (ROM). The memory 915 may store computer-readable, computer-executable software/firmware code 920 including instructions that, when executed, cause the processor 905 to perform various functions described herein (e.g., inter-subnet and intra-subnet roaming, etc.). Alternatively, the software/firmware code 920 may not be directly executable by the processor 905 but cause a computer (e.g., when compiled and executed) to perform functions described herein. The processor 905 may include an intelligent hardware device, (e.g., a central processing unit (CPU), a microcontroller, an ASIC, etc.).

Figure 10:
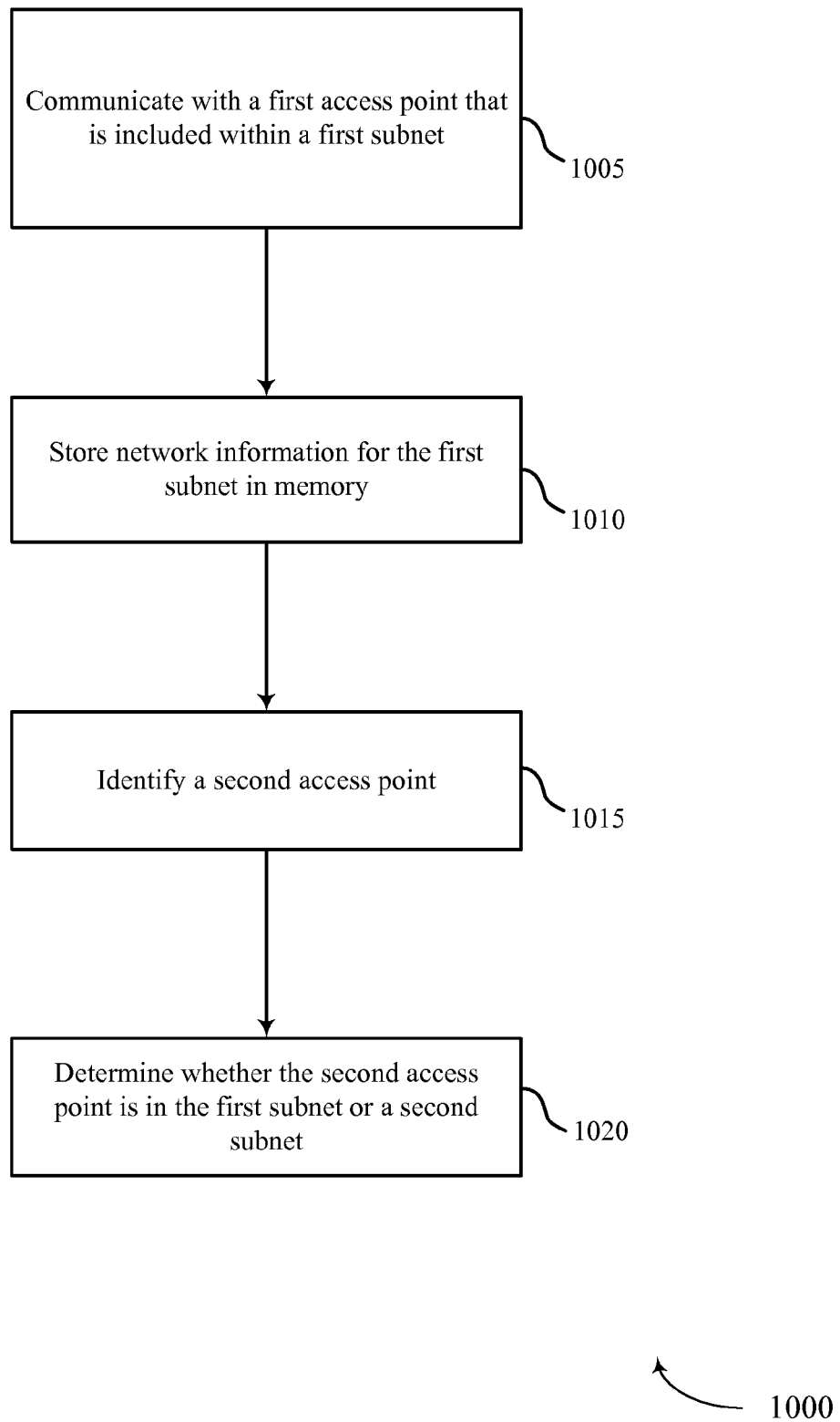
FIGS. 10-13 illustrate methods for inter-subnet and intra-subnet roaming in accordance with various aspects of the present disclosure.

FIG. 10 shows a flowchart illustrating a method 1000 for inter-subnet and intra-subnet roaming in accordance with various aspects of the present disclosure. The operations of method 1000 may be implemented by a STA 115 or its components as described with reference to FIGS. 1-9. For example, the operations of method 1000 may be performed by the roaming manager 610 as described with reference to FIGS. 6-9. In some examples, a STA 115 may execute a set of codes to control the functional elements of the STA 115 to perform the functions described below. Additionally or alternatively, the STA 115 may perform aspects the functions described below using special-purpose hardware. The STA 115 may include a host processor and a radio processor. The host processor and the radio processor may be integrated or co-located on a single chip. Alternatively, the host processor and radio processor may be located on separate chips. The radio processor may be associated with memory which the host processor may access either directly (e.g., via signaling between the radio processor and the memory) or indirectly (e.g., via signaling passed through other layers or components of the STA 115).

At block 1005, the STA 115 communicate with a first access point that is included within a first subnet as described with reference to FIGS. 2-5. In certain examples, the operations of block 1005 may be performed or facilitated by the host processor 705 as described with reference to FIG. 7. At block 1010, the STA 115 may store network information for the first subnet in memory as described with reference to FIGS. 2-5. In some cases, storing the network information in memory includes caching the network information in firmware. In certain examples, the operations of block 1010 may be performed or facilitated by the host processor 705 as described with reference to FIG. 7. At block 1015, the STA 115 may identify a second access point as described with reference to FIGS. 2-5. In some cases, identifying the second access point may include the roaming from the first access point to the second access point. In certain examples, the operations of block 1015 may be performed or facilitated by the radio processor 710 as described with reference to FIG. 7. At block 1020, the STA 115 may determine whether the second access point is in the first subnet or a second subnet as described with reference to FIGS. 2-5. The determination may be made by the radio processor without communication between the radio processor and the host processor (e.g., the host processor may be in a sleep state). The determination may be based at least in part on the stored network information as described with reference to FIGS. 2-5. In certain examples, the operations of block 1020 may be performed or facilitated by the radio processor 710 as described with reference to FIG. 7.

Figure 11:
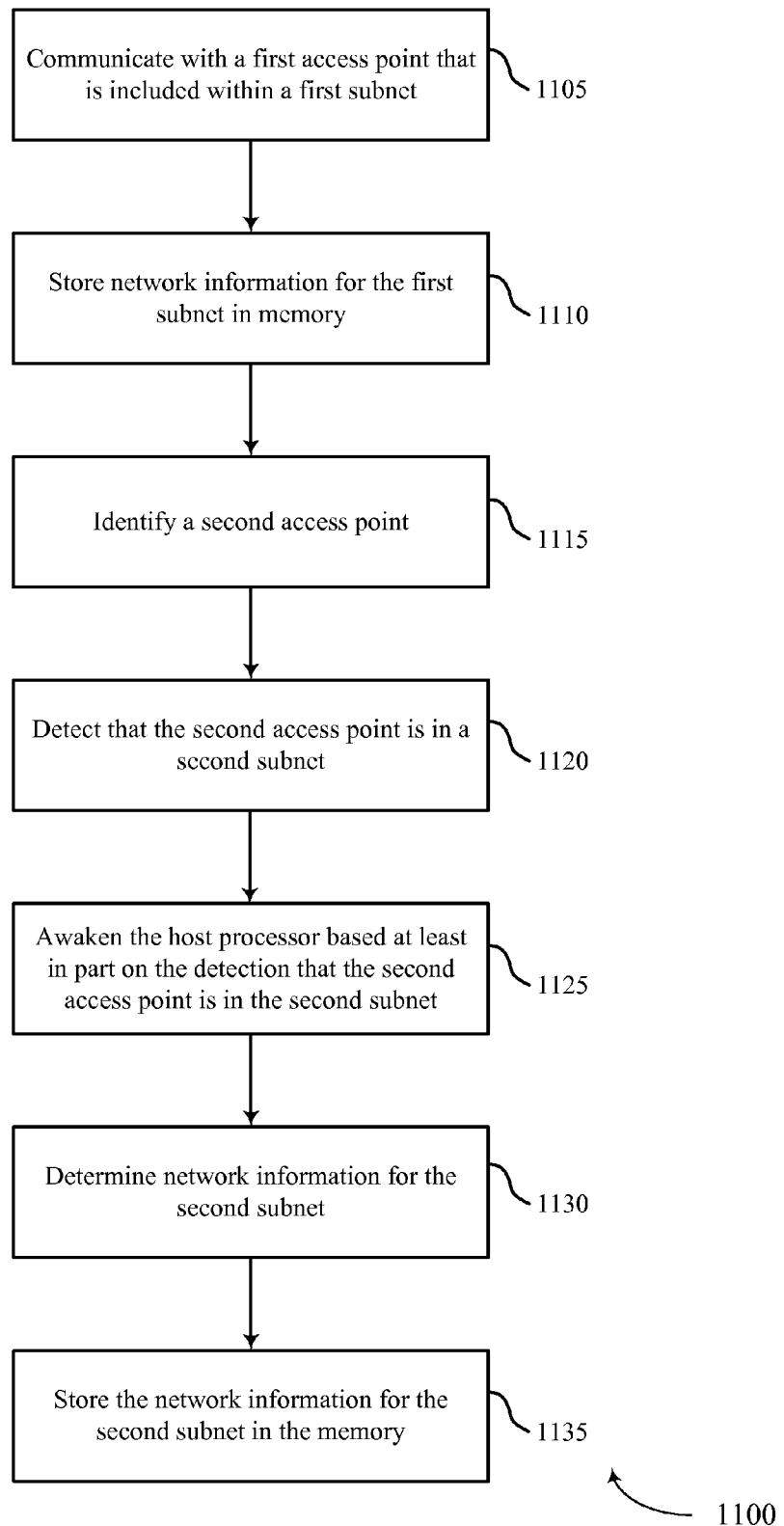

FIG. 11 shows a flowchart illustrating a method 1100 for inter-subnet and intra-subnet roaming in accordance with various aspects of the present disclosure. The operations of method 1100 may be implemented by a STA 115 or its components as described with reference to FIGS. 1-9. For example, the operations of method 1100 may be performed by the roaming manager 610 as described with reference to FIGS. 6-9. In some examples, a STA 115 may execute a set of codes to control the functional elements of the STA 115 to perform the functions described below. Additionally or alternatively, the STA 115 may perform aspects the functions described below using special-purpose hardware. The method 1100 may also incorporate aspects of method 1000 of FIG. 10.

At block 1105, the STA 115 communicate with a first access point that is included within a first subnet as described with reference to FIGS. 2-5. In certain examples, the operations of block 1105 may be performed or facilitated by the host processor 705 as described with reference to FIG. 7. At block 1110, the STA 115 may store network information for the first subnet in memory as described with reference to FIGS. 2-5. In some cases, storing the network information in memory includes caching the network information in firmware. In certain examples, the operations of block 1110 may be performed or facilitated by the host processor 705 as described with reference to FIG. 7. At block 1115, the STA 115 may identify a second access point as described with reference to FIGS. 2-5. In some cases, identifying the second access point may include the roaming from the first access point to the second access point. In certain examples, the operations of block 1115 may be performed or facilitated by the radio processor 710 as described with reference to FIG. 7. At block 1120, the STA 115 may detect that the second access point is in a second subnet as described with reference to FIGS. 2-5. The detection may be made by the radio processor without communication between the radio processor and the host processor (e.g., the host processor may be in a sleep state). The determination may be based at least in part on the stored network information as described with reference to FIGS. 2-5. In certain examples, the operations of block 1120 may be performed or facilitated by the radio processor 710 as described with reference to FIG. 7.

At block 1125, the STA 115 may awaken the host processor based at least in part on the detection that the second access point is in the second subnet as described with reference to FIGS. 2-5. In certain examples, the operations of block 1125 may be performed or facilitated by the radio processor 710 as described with reference to FIG. 7. At block 1130, the STA 115 may determine network information for the second subnet as described with reference to FIGS. 2-5. For example the STA 115 may implement DHCP to determine the gateway IP address, gateway MAC address, and gateway IP address type associated with a gateway of the second subnet. In certain examples, the operations of block 1130 are performed or facilitated by the host processor 705 as described with reference to FIG. 7. At block 1135, the STA 115 may store the network information for the second subnet in the memory as described with reference to FIGS. 2-5. The operations of block 1135 may be performed or facilitated by the host processor 705 as described with reference to FIGS. 2-5.

Figure 12:
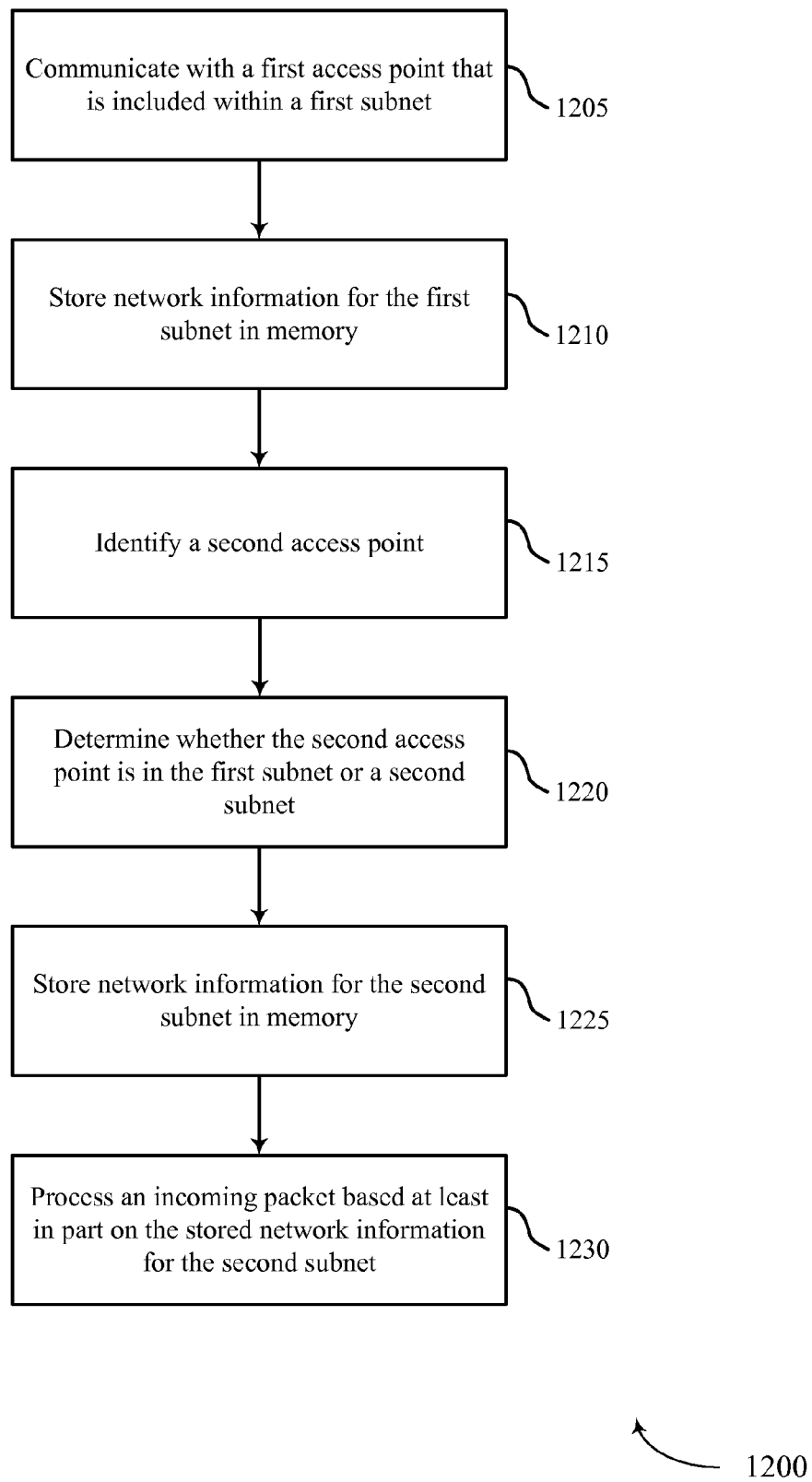

FIG. 12 shows a flowchart illustrating a method 1200 for inter-subnet and intra-subnet roaming in accordance with various aspects of the present disclosure. The operations of method 1200 may be implemented by a STA 115 or its components as described with reference to FIGS. 1-9. For example, the operations of method 1200 may be performed by the roaming manager 610 as described with reference to FIGS. 6-9. In some examples, a STA 115 may execute a set of codes to control the functional elements of the STA 115 to perform the functions described below. Additionally or alternatively, the STA 115 may perform aspects the functions described below using special-purpose hardware. The method 1200 may also incorporate aspects of methods 1000, and 1100 of FIGS. 10-11.

At block 1205, the STA 115 communicate with a first access point that is included within a first subnet as described with reference to FIGS. 2-5. In certain examples, the operations of block 1205 may be performed or facilitated by the host processor 705 as described with reference to FIG. 7. At block 1210, the STA 115 may store network information for the first subnet in memory as described with reference to FIGS. 2-5. In certain examples, the operations of block 1210 may be performed or facilitated by the host processor 705 as described with reference to FIG. 7. At block 1215, the STA 115 may identify a second access point as described with reference to FIGS. 2-5. In certain examples, the operations of block 1215 may be performed or facilitated by the radio processor 710 as described with reference to FIG. 7. At block 1220, the STA 115 may determine whether the second access point is in the first subnet or a second subnet as described with reference to FIGS. 2-5. The determination may be made by the radio processor without communication between the radio processor and the host processor (e.g., the host processor may be in a sleep state). In certain examples, the operations of block 1220 may be performed or facilitated by the radio processor 710 as described with reference to FIG. 7.

At block 1225, the STA 115 may store network information for the second subnet as described with reference to FIGS. 2-5. In some cases, the network information for the second subnet may replace the network information for the first subnet. In other cases, the network information for the second subnet may be stored in addition to the network information for the first subnet. In some cases the network information for the second subnet is stored after detection that the second access point is in the second subnet. In certain cases the operations of block 1225 are performed or facilitated by the host processor 705 as described with reference to FIG. 7. At block 1230, the STA 115 may process an incoming packet based at least in part on the stored network information for the second subnet as described with reference to FIGS. 2-5. In some cases, the radio processor facilitates the awakening of the host processor based at least in part on the receipt of the incoming packet. In certain examples, the operations of block 1230 are performed or facilitated by the host processor 705 as described with reference to FIG. 7.

Figure 13:
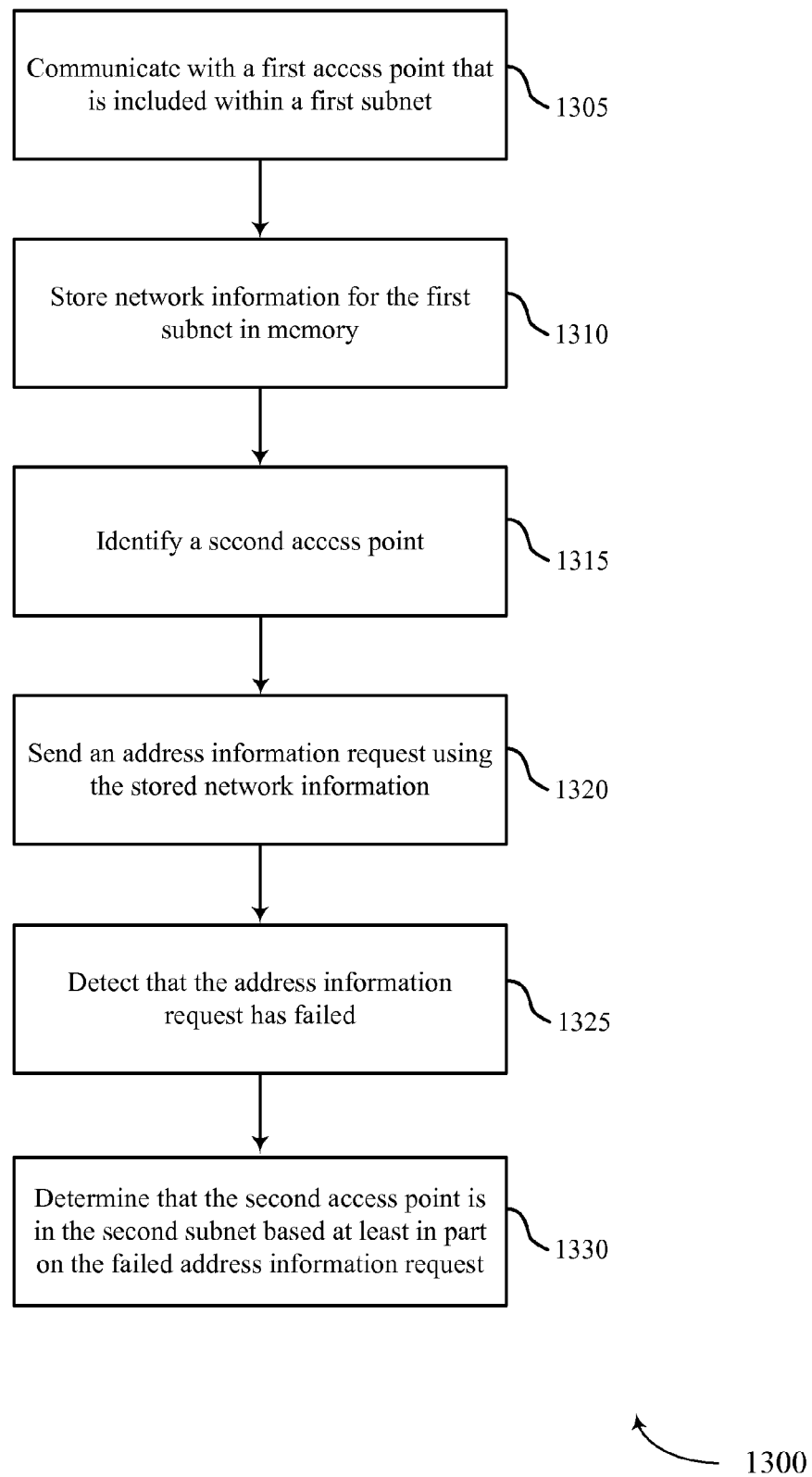

FIG. 13 shows a flowchart illustrating a method 1300 for inter-subnet and intra-subnet roaming in accordance with various aspects of the present disclosure. The operations of method 1300 may be implemented by a STA 115 or its components as described with reference to FIGS. 1-9. For example, the operations of method 1300 may be performed by the roaming manager 610 as described with reference to FIGS. 6-9. In some examples, a STA 115 may execute a set of codes to control the functional elements of the STA 115 to perform the functions described below. Additionally or alternatively, the STA 115 may perform aspects the functions described below using special-purpose hardware. The method 1300 may also incorporate aspects of methods 1000, 1100, and 1200 of FIGS. 10-12.

At block 1305, the STA 115 communicate with a first access point that is included within a first subnet as described with reference to FIGS. 2-5. In certain examples, the operations of block 1305 may be performed or facilitated by the host processor 705 as described with reference to FIG. 7. At block 1310, the STA 115 may store network information for the first subnet in memory as described with reference to FIGS. 2-5. In certain examples, the operations of block 1310 may be performed or facilitated by the host processor 705 as described with reference to FIG. 7. At block 1315, the STA 115 may identify a second access point as described with reference to FIGS. 2-5. In certain examples, the operations of block 1315 may be performed or facilitated by the radio processor 710 as described with reference to FIG. 7.

At block 1320, the STA 115 may send an address information request using the stored network information as described with reference to FIGS. 2-5. For example, the STA 115 may send an ARP request or a neighbor solicitation request. In certain examples, the operations of block 1320 may be performed or facilitated by the radio processor 710 as described with reference to FIG. 7. At block 1325, the STA 115 may detect that the address information request has failed as described with reference to FIGS. 2-5. In some cases, detecting that the address information request has failed is based at least in part on the detection that the address information request has failed to elicit a response. In certain examples, the operations of block 1325 are performed or facilitated by the radio processor 710 as described with reference to FIG. 7. At block 1330, the STA 115 may determine that the second access point is in the second subnet based at least in part on the failed address information request as described with reference to FIGS. 2-5. In certain examples, the operations of block 1330 may be performed or facilitated by the radio processor 710 as described with reference to FIG. 7.

Thus, methods 1000, 1100, 1200, and 1300 may provide for inter-subnet and intra-subnet roaming. It should be noted that methods 1000, 1100, 1200, and 1300 describe possible implementation, and that the operations and the steps may be rearranged or otherwise modified such that other implementations are possible. In some examples, aspects from two or more of the methods 1000, 1100, 1200, and 1300 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:
1. An apparatus for wireless communication, comprising:
a radio processor;
a host processor;

memory in electronic communication with the radio processor or the host processor; and instructions stored in the memory and operable, when executed by the radio processor or the host processor, to cause the apparatus to:

communicate with a first access point that is included within a first subnet;

store network information for the first subnet in the memory; and identify a second access point; and instructions stored in the memory and operable, when executed by the radio processor, to cause the apparatus, without communication between the radio processor and the host processor during a determination, to determine whether the second access point is in the first subnet or a second subnet based at least in part on the stored network information.

2. The apparatus of claim 1, wherein the determination is made by the radio processor while the host processor is in a sleep state.

3. The apparatus of claim 2, wherein the instructions are operable, when executed by the radio processor, to cause the apparatus to:

detect that the second access point is in the second subnet; and awaken the host processor from the sleep state based at least in part on the detection that the second access point is in the second subnet.

4. The apparatus of claim 3, wherein the instructions are operable, when executed by the host processor, to cause the apparatus to:

determine network information for the second subnet; and store the network information for the second subnet in the memory.

5. The apparatus of claim 1, wherein the instructions that cause the apparatus to store the network information in the memory comprise instructions that cause the host processor to cache the network information in firmware.

6. The apparatus of claim 1, wherein the instructions that cause the apparatus to identify the second access point are further operable, when executed by the radio processor, to cause the apparatus to:

initiate roaming to the second access point.

7. The apparatus of claim 1, wherein:

the instructions are further operable, when executed by the host processor or the radio processor, to cause the apparatus to receive an incoming packet at the apparatus from the second access point; and the instructions are operable, when executed by the host processor, to cause the apparatus to:

store network information for the second subnet in the memory; and process the incoming packet based at least in part on the stored network information for the second subnet.

8. The apparatus of claim 7, wherein the host processor is configured to awaken from a sleep state in response to receipt of the incoming packet.

9. The apparatus of claim 1, wherein the instructions are operable, when executed by the radio processor, to cause the apparatus to:

initiate an address resolution process to determine whether the second access point is in the first subnet or the second subnet.

10. The apparatus of claim 9, wherein the instructions are further operable, when executed by the radio processor, to cause the apparatus to:

determine that the host processor has awakened from a sleep state during the address resolution process; and terminate the address resolution process based at least in part on the determination that the host processor has awakened from the sleep state.

11. The apparatus of claim 1, wherein the instructions are operable, when executed by the radio processor, to cause the apparatus to:

detect that the second access point is in the same subnet as the first access point; and allow the host processor to remain in a sleep state based at least in part on the detection that the second access point is in the same subnet as the first access point.

12. The apparatus of claim 1, wherein the instructions that are operable to cause the apparatus to determine the whether the second access point is in the first subnet or the second subnet are further operable, when executed by the radio processor, to cause the apparatus to:

send an address information request using the stored network information;

detect that the address information request has failed; and determine that the second access point is in the second subnet based at least in part on the failed address information request.

13. The apparatus of claim 12, wherein the address information request is at least an address resolution protocol (ARP) request, or a neighbor solicitation request, or a combination thereof.

14. The apparatus of claim 1, wherein the instructions that are operable to cause the apparatus to determine the whether the second access point is in the second subnet are further operable, when executed by the radio processor, to cause the apparatus to:

send an address information request using the stored network information;

receive a response to the address information request; and determine that the second access point is in the first subnet based at least in part on the response to the address information request.

15. The apparatus of claim 1, wherein the stored network information comprises gateway information associated with the first subnet, the gateway information comprising at least one of a gateway internet protocol (IP) address, or a gateway media access control (MAC) address, or a gateway address type, or a combination thereof.

16. The apparatus of claim 1, wherein the instructions are operable, when executed by the host processor, to cause the apparatus to:

perform a dynamic host configuration protocol (DHCP) process to determine the network information for the first subnet.

17. A method of wireless communication, comprising:

communicating between a station and a first access point that is included within a first subnet, wherein the station includes a radio processor and a host processor;

storing, by the station, network information for the first subnet in memory;

identifying, by the station, a second access point; and determining whether the second access point is in the first subnet or a second subnet based at least in part on the stored network information, the determination by the radio processor without communication between the radio processor and the host processor during the determination.

18. The method of claim 17, wherein the host processor is in a sleep state while the radio processor determines whether the second access point is in the first subnet or the second subnet based at least in part on the stored network information, the method further comprising:

detecting that the second access point is in the second subnet; and awakening the host processor from the sleep state based at least in part on the detection that the second access point is in the second subnet.

19. The method of claim 17, wherein storing the network information comprises storing the network information by the host processor, the method further comprising:

storing, by the host processor, network information for the second subnet in the memory;

receiving an incoming packet at the station from the second access point; and processing the incoming packet based at least in part on the stored network information for the second subnet.

20. An apparatus for wireless communication, comprising:

means for communicating between the apparatus and a first access point that is included within a first subnet, wherein the apparatus includes a radio processor and a host processor;

means for storing network information for the first subnet in memory;

means for identifying a second access point; and means for determining whether the second access point is in the first subnet or a second subnet based at least in part on the stored network information, the determination by the radio processor without communication between the radio processor and the host processor during the determination.

* * * * *